US012607310B1

(12) United States Patent
Gupta

(10) Patent No.: US 12,607,310 B1
(45) Date of Patent: Apr. 21, 2026

(54) MOBILE LIGHTING SYSTEM AND PLATFORM

(71) Applicant: ANTRISH INC., San Diego, CA (US)

(72) Inventor: Ankit Gupta, San Diego, CA (US)

(73) Assignee: ANTRISH, INC., San Diego, CA (US)

( * ) Notice: Subject to any disclaimer, the term of this patent is extended or adjusted under 35 U.S.C. 154(b) by 0 days.

(21) Appl. No.: 19/367,672

(22) Filed: Oct. 23, 2025

Related U.S. Application Data

(60) Provisional application No. 63/855,123, filed on Jul. 31, 2025.

(51) Int. Cl.
| | |
|---|---|
| *F21L 4/08* | (2006.01) |
| *F21V 23/00* | (2015.01) |
| *F21V 23/04* | (2006.01) |
| *F21V 23/06* | (2006.01) |
| *H02J 7/00* | (2006.01) |
| *H02J 7/06* | (2006.01) |
| *H02J 7/35* | (2006.01) |
| *F21Y 115/10* | (2016.01) |

(52) U.S. Cl.
CPC .............. *F21L 4/08* (2013.01); *F21V 23/003* (2013.01); *F21V 23/0428* (2013.01); *F21V 23/0442* (2013.01); *F21V 23/06* (2013.01); *H02J 7/00034* (2020.01); *H02J 7/00045* (2020.01); *H02J 7/00308* (2020.01); *H02J 7/0048* (2020.01); *H02J 7/06* (2013.01); *H02J 7/35* (2013.01); *F21Y 2115/10* (2016.08); *H02J 2207/20* (2020.01); *H02J 2207/30* (2020.01)

(58) Field of Classification Search
CPC ..... F21L 4/08; H02J 7/00045; H02J 7/00308; H02J 7/0048; H02J 7/00034; H02J 7/06; H02J 7/35; H02J 2207/20; H02J 2207/30; F21V 23/003; F21V 23/0428; F21V 23/0442; F21V 23/06; F21Y 2115/10
See application file for complete search history.

(56) References Cited

U.S. PATENT DOCUMENTS

| | | | |
|---|---|---|---|
| 2017/0082250 A1* | 3/2017 | Heilbrun | ................... F21L 4/08 |
| 2018/0106461 A1* | 4/2018 | Hall | ........................ F21K 9/232 |
| 2024/0247794 A1* | 7/2024 | Anderton | .............. F21V 23/005 |

* cited by examiner

*Primary Examiner* — Bao Q Truong
(74) *Attorney, Agent, or Firm* — Jaquez Land Greenhaus & McFarland LLP; Bruce W. Greenhaus

(57) ABSTRACT

A mobile lighting system to integrate multiple power sources into a unified platform for portable, uninterrupted illumination. In various embodiments, the system includes a light source, an AC socket connector, internal rechargeable batteries, and external battery packs to thermally isolate high-temperature LED zones from power storage to reduce risk of thermal runaway. External interfaces include a USB Power Delivery port enabling bidirectional power transfer, dynamic role switching between source and sink, and data communication with mobile devices. Solar panel input may supplement charging. Intelligent switching logic, executed by stored instructions in a controller, manages transitions between AC, internal, and external power sources based on sensor-detected availability, charge levels, and user-defined priorities. Modular features include an on-device manual switch for on/off and dimming control, hot-swappable batteries, and real-time control and diagnostics through visual indicators or a connected application.

29 Claims, 16 Drawing Sheets

350

314

318
316

Mobile App and Data Feedback

Brightness

On

Mode | Auto | Battery | Solar
Battery Level    75%
Power Source    Battery
Solar Input Voltage   14.2V Error Diagnostics
• Overtemperature
• Power Input Fault
• Battery Health Usage Logs

MOBILE LIGHTING SYSTEM AND PLATFORM

CROSS REFERENCE TO RELATED APPLICATIONS

This application claims priority benefit to U.S. Provisional Application, Ser. No. 63/855,123, filed Jul. 31, 2025, by Ankit GUPTA, which is incorporated herein by reference in its entirety. U.S. patent application Ser. No. 19/047,017 is incorporated herein by reference in its entirety.

(1) TECHNICAL FIELD

The disclosed method and apparatus relate generally to systems for providing portable lighting. In particular, the disclosed method and apparatus relate to a mobile lighting system and platform with intelligent multi-source power switching, manual control, USB PD (Universal Serial Bus Power Delivery) and/or solar integration.

(2) BACKGROUND

The conventional electric lightbulb has remained fundamentally unchanged for over a century. Conventional electric lightbulbs require continuous connections to a fixed AC (Alternating Current) power supply and typically require a wall-mounted switch. Conventional lightbulbs are limited to environments with electrical wiring infrastructure. Conventional lightbulbs are ineffective in off-grid, emergency or mobile scenarios.

An instructive parallel can be drawn from the evolution of telecommunication. Just as the rigid landline telephone gave way to mobile phones—freeing users from fixed wiring—the future of lighting demands a similar transformation.

Using conventional lightbulbs at construction sites, vendor stalls, in emergency response, or camping requires lightbulbs mounted at varying locations and angles, which is at best challenging. However, deploying traditional lightbulbs in such scenarios necessitates long runs of electrical wires, posing safety hazards and incurring setup time and expense.

Accordingly, it would be advantageous to provide a lighting system that is mobile and does not require fixed infrastructure.

SUMMARY

Various embodiments of a method and apparatus for a mobile lighting system are disclosed.

Various embodiments of mobile lighting systems that overcome engineering and design challenges are presented. In some embodiments, to facilitate mobility, the mobile lighting systems support multiple portable power sources, such as internal rechargeable batteries, external battery packs and/or USB power banks. The lightbulb supports direct input from mobile phone batteries via USB Power Delivery (USB PD), and solar panels for input during daylight, thereby providing a clean, renewable energy source. The variety of power inputs/interfaces allows the lightbulb to utilize readily available devices (e.g., power banks, mobile chargers), supporting scalable deployment and easy adoption without custom accessories, providing enhanced mobility. For example, in some embodiments, the power sources enable usages that are independent of AC wall sockets. In some embodiments, alternate power sources allow lightbulbs to function during power outages, outdoor deployments, and/or when no AC power is available. Seamless operations can be provided by dynamically managing/switching power sources between AC, internal battery, external USB battery, solar power and mobile phone. The switching occurs based on availability, charge levels and priority hierarchies to ensure continuity without manual intervention or flickering. In some embodiments, the mobile lightbulb incorporates integrated manual controls (on/off settings and dimming switches) directly on the body of the lightbulb to allow user-initiated control regardless of infrastructure, especially in emergency and off-grid use cases. In some embodiments, the power input includes a universally adopted interface, such as USB-C with USB PD protocol (e.g., a common interface standard), to reduce ecosystem friction and enhance user flexibility. Lighting systems, especially high-lumen LED (Light Emitting Diode) configurations, require greater power levels than the basic USB outputs. High-Power Configurations High-output LEDs generate substantial heat. Integrating high-capacity batteries within the same enclosure increases the risk of thermal runaway, especially under prolonged use. Prior art lighting systems are limited in the brightness they provide. The brightness of the current mobile lightbulb is enabled by externalized battery packs, keeping high-temperature zones separated from power storage. The external battery packs keep high-temperature zones separated from the power storage, enhancing safety. The system also includes a fault detection circuit. When a fault is detected at a particular interface, that interface stops allowing power sources to power the lightbulb by that interface.

Integration with Mobile Phones as Power and Control Hubs

The current mobile lightbulb interfaces with a mobile device, allowing (1) the mobile device to (via USB-C data link or app) control the lightbulb and (2) the mobile device to provide backup power. This dual-role usage of mobile phones facilitates the mobility of the lightbulb.

Real-Time System Feedback and Diagnostics

The current mobile system provides real-time feedback to the user regarding: (a) active power source (AC, battery, solar), (b) charging status, (c) fault warnings, (d) thermal warnings and (e) battery levels. The feedback may be implemented via visual indicators (LEDs), display modules, or telemetry to mobile applications.

Expandability, Modularity, and Hot Swapping

The current mobile system accommodates: (a) hot-swappable external battery packs (to replace batteries during operation), (b) multiple battery capacity configurations, and (c) support for third-party power sources (e.g., certified USB PD power banks), enabling cross-device compatibility and easy upgrades.

Solar Hybrid Operation

Interfaces to solar panels facilitate usage in locations where it is difficult to find batteries or AC power sources. The portable lightbulb supports solar panel input, optionally with MPPT (Maximum Power Point Tracking) for optimal energy extraction, and intelligent routing of solar power for either direct LED use or battery charging.

In some embodiments, the mobile lighting system includes a light source, such as a lightbulb or LED array. In some embodiments, the mobile lighting system includes a connector for attaching the standard light source, such as a standard lightbulb socket. In some embodiments, the interfaces to the power sources include a connector that connects to an AC socket. In some embodiments, the mobile lighting system includes one or more of a battery charger (e.g., an integrated battery charger), an internal rechargeable battery, an external USB Power Delivery (USB PD) module, mobile phone batteries and solar panels. In some embodiments, the various alternative power sources are integrated into a unified system that automatically determines the power sources used and whether a given port provides power, facilitates communications or receives power. In some embodiments, user-defined settings include priority settings for determining the priority assigned to each possible power source. In some embodiments, at any given moment, the lightbulb automatically prioritizes which power source is relied upon by the mobile lighting system.

In some embodiments, a manual control interface is included on the lightbulb housing. The manual control interface allows the user to turn the light source of the mobile lighting system on and off. The interface can also be used to dim the light source. In some embodiments, a USB-C port supports dynamic, bi-directional PD negotiation for both power and data exchange, enabling system control, battery monitoring, and emergency lighting using mobile devices. Optionally, solar power is regulated via a Maximum Power Point Tracking (MPPT) controller, which supplements daytime charging. In some embodiments, the mobile lighting system allows hot-swapping external power sources and supports modular, cross-compatible configurations.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

A portable lightbulb is disclosed that can be used with or without an AC power source and remains on, despite the AC power source losing power.

Figure 1:
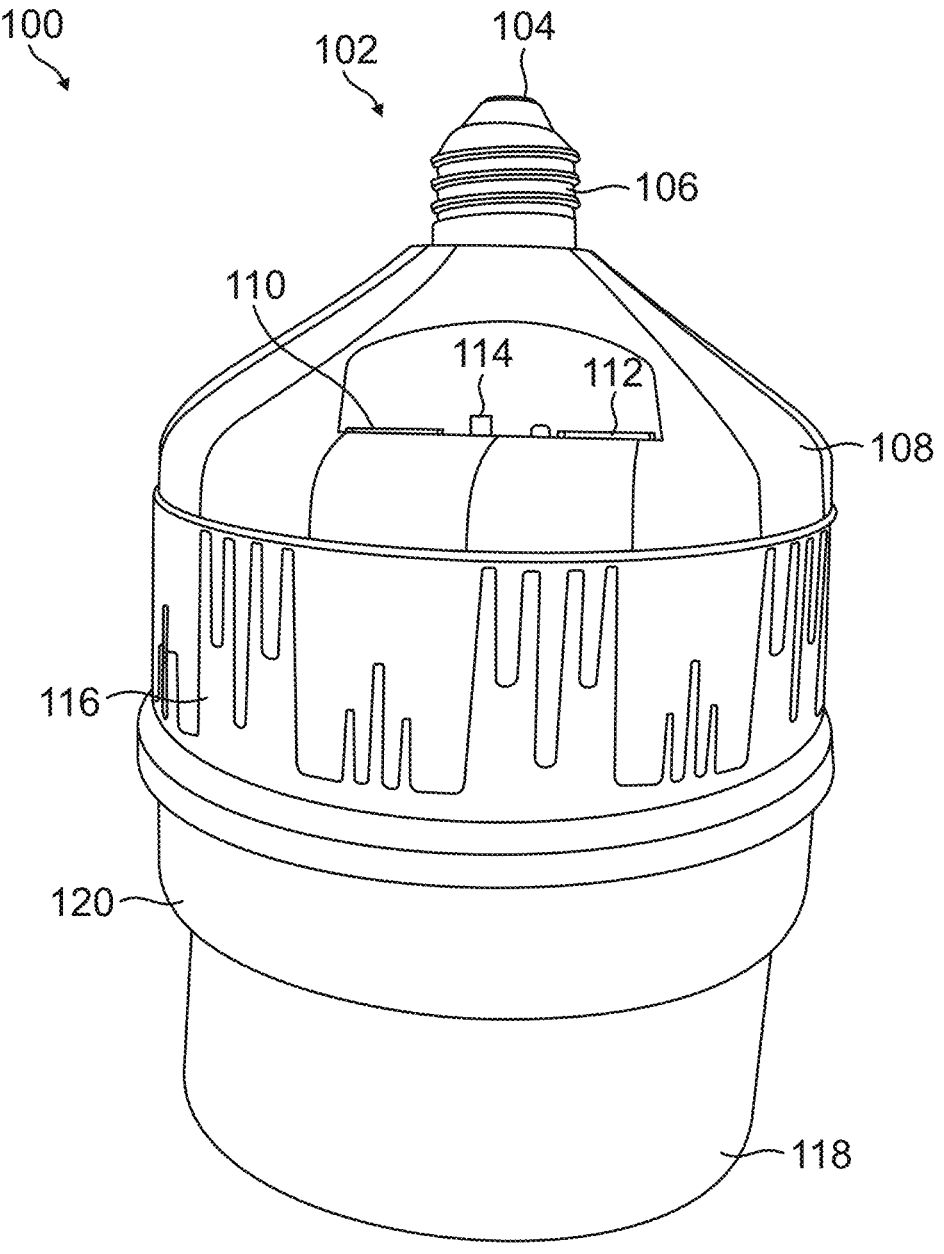
FIG. 1 illustrates an example of a portable lightbulb.

FIG. 1 illustrates an example of a lightbulb 100 (or lighting system), which is portable. In various embodiments of the lightbulb 100, the same lightbulb 100 can be used as a portable lantern, wall-mounted fixture, clamp light, ceiling-integrated emergency light, work light or task light. In the example of FIG. 1, the portable lightbulb 100 includes a lightbulb socket connector 102 having electrical contacts 104 and 106. The lightbulb socket connector 102 can be replaced with any electrical connector that connects to a wall socket or a connector to an Alternating Current (AC) provided by a public utility, for example. The lightbulb socket connector 102 is located on a cone 108.

The cone 108 includes the USB ports 110 and 112. The USB ports 110 and 112 can be used for powering the lightbulb 100, providing power to other electrical devices for interfacing with the lightbulb 100. The cone 108 also includes a manual switch 114 for manually turning (or setting) the lightbulb 100 on and off. The cone 108 is not necessary and can be replaced with any structure that attaches the lightbulb socket connector 102 to the housing 116. The lightbulb 100 also includes the housing 116, which houses the lighting system and the internal structures and circuitry of the lightbulb 100.

The dome 118 is translucent. A light source shines through dome 118. In some embodiments, the dome 118 is translucent and includes a diffuser or a scattering material that diffuses or scatters light from the light source to provide a uniform illumination. The band 120 connects the dome 118 to the housing 116.

Figure 2:
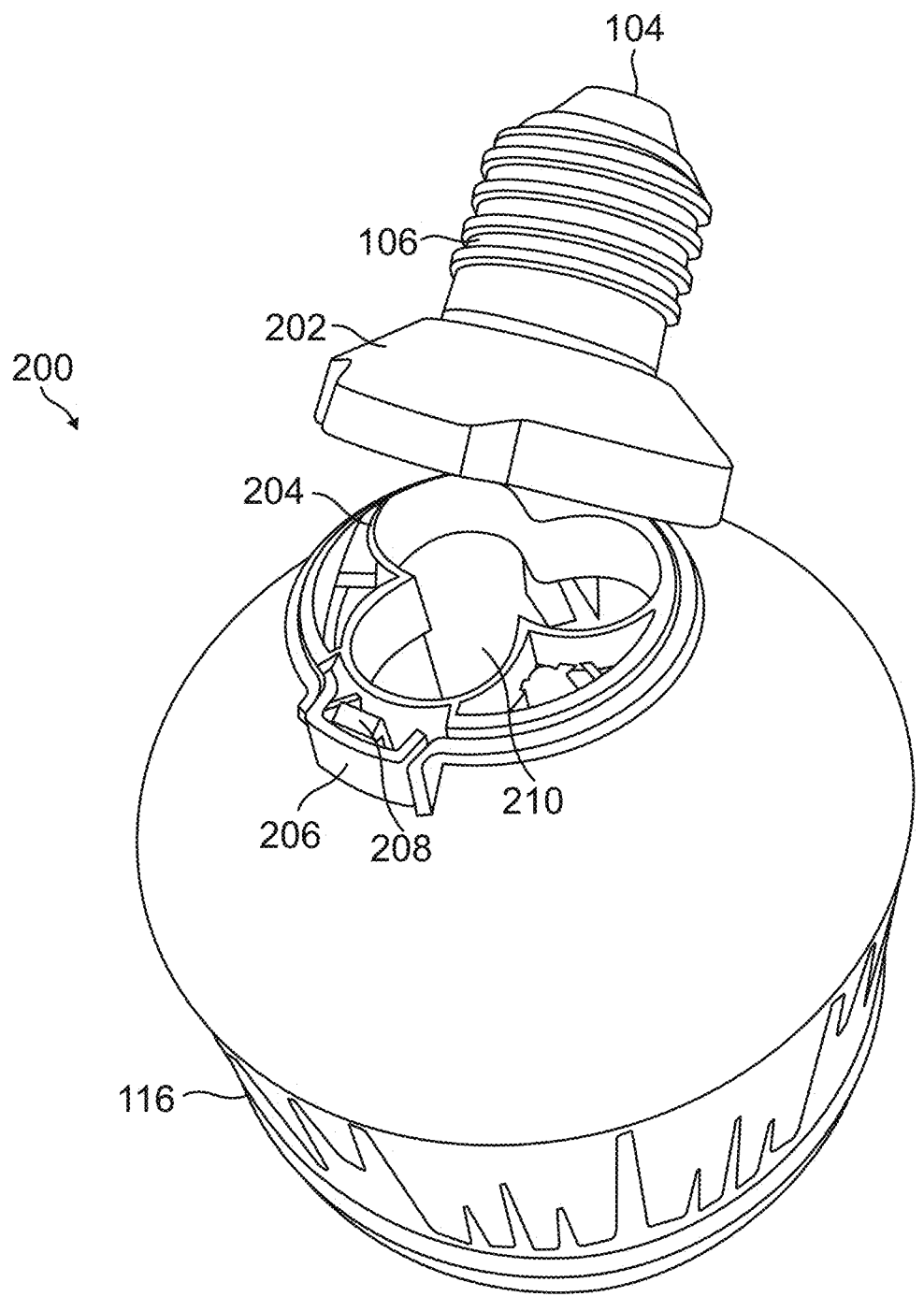
FIG. 2 illustrates an embodiment of a lightbulb, which includes a cap, a collar, a switch, a tab and an interior battery chamber.
Figure 3:
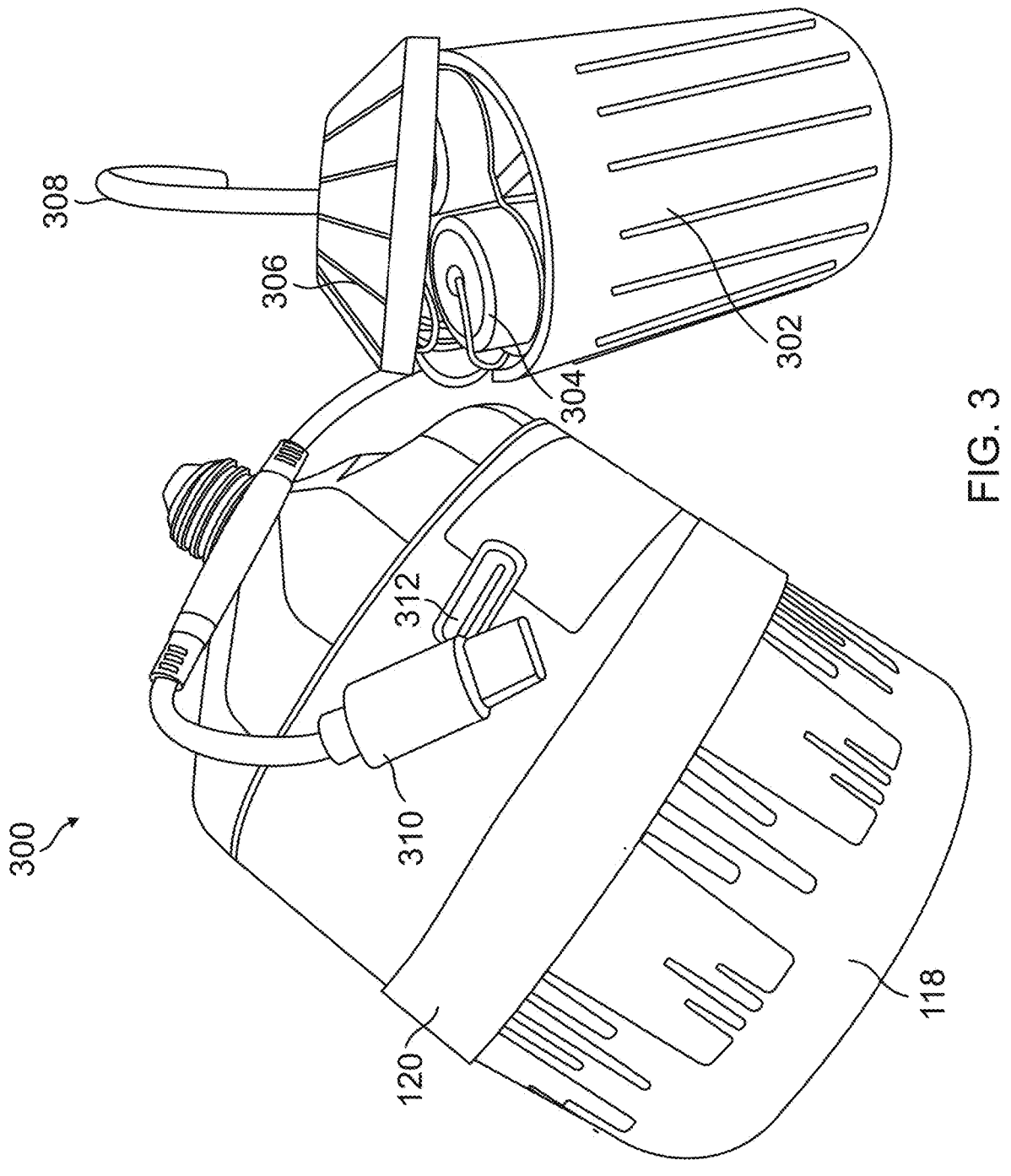
FIG. 3 illustrates an embodiment of a system that includes the external battery source holding the batteries, the cap and the hook.

FIG. 2 illustrates an embodiment of a lightbulb 200, which includes a cap 202, a collar 204, a switch 206, a tab 208 and an interior chamber 210. The lightbulb 200 is an embodiment of lightbulb 100. The cap 202 may be hinged to the cone 108. The collar 204 is rigidly affixed to the cone 108. When the switch 206 is depressed, the tab 208 moves inward, releasing the cap 202, allowing the cap 202 to swing open, providing access to the interior chamber 210. In some embodiments, interior chamber 210 is an internal battery chamber. In some embodiments, the bulb housing includes a mounting interface configured to receive and secure an external battery module while maintaining an air gap between the battery and the bulb for thermal isolation FIG. 3 illustrates an embodiment of a system 300, which includes the external battery source 302 (e.g., a battery pack) holding the batteries 304, the cap 306 and hook 308. The cap 306 may be hinged to the external battery source 302 to swing open and closed, allowing access to the batteries 304. The external battery source 302 may be hung from a hook, bar or hole, for example. In some embodiments, the hook 308 is flexible and can be bent to attach to a variety of structures. The external battery source 302 is electrically connected to a USB power cord 310, which in turn is attached to the lightbulb 100 via USB port 312. The external battery source 302 powers the lightbulb 100 when the AC power is not available or the user desires. By providing the external battery source 302, the brightness of the lightbulb 100, and how long the lightbulb 100 can remain powered, is not limited by the size of the lightbulb 100.

Figure 4:
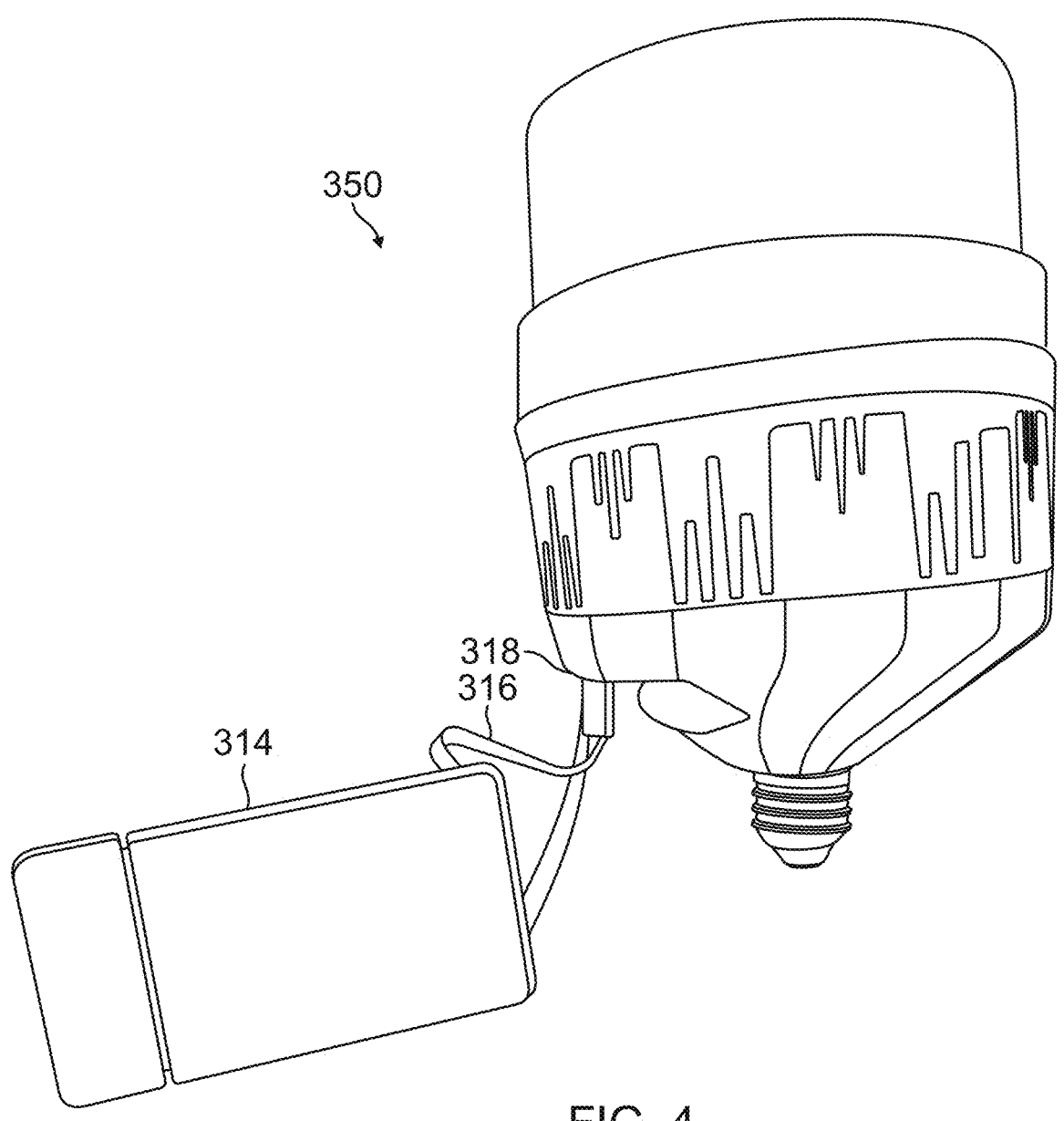
FIG. 4 illustrates an embodiment of a system that includes the external USB battery source.

FIG. 4 illustrates an embodiment of a mobile bulb 350, which is similar to FIG. 3. In FIG. 4, the battery pack 314 is a commercially available USC compatible power bank, which can also be used to charge the mobile bulb. Battery pack 314 attaches to mobile bulb 350, via cord 316 into a USB port 318 on mobile bulb 350.

Figure 5:
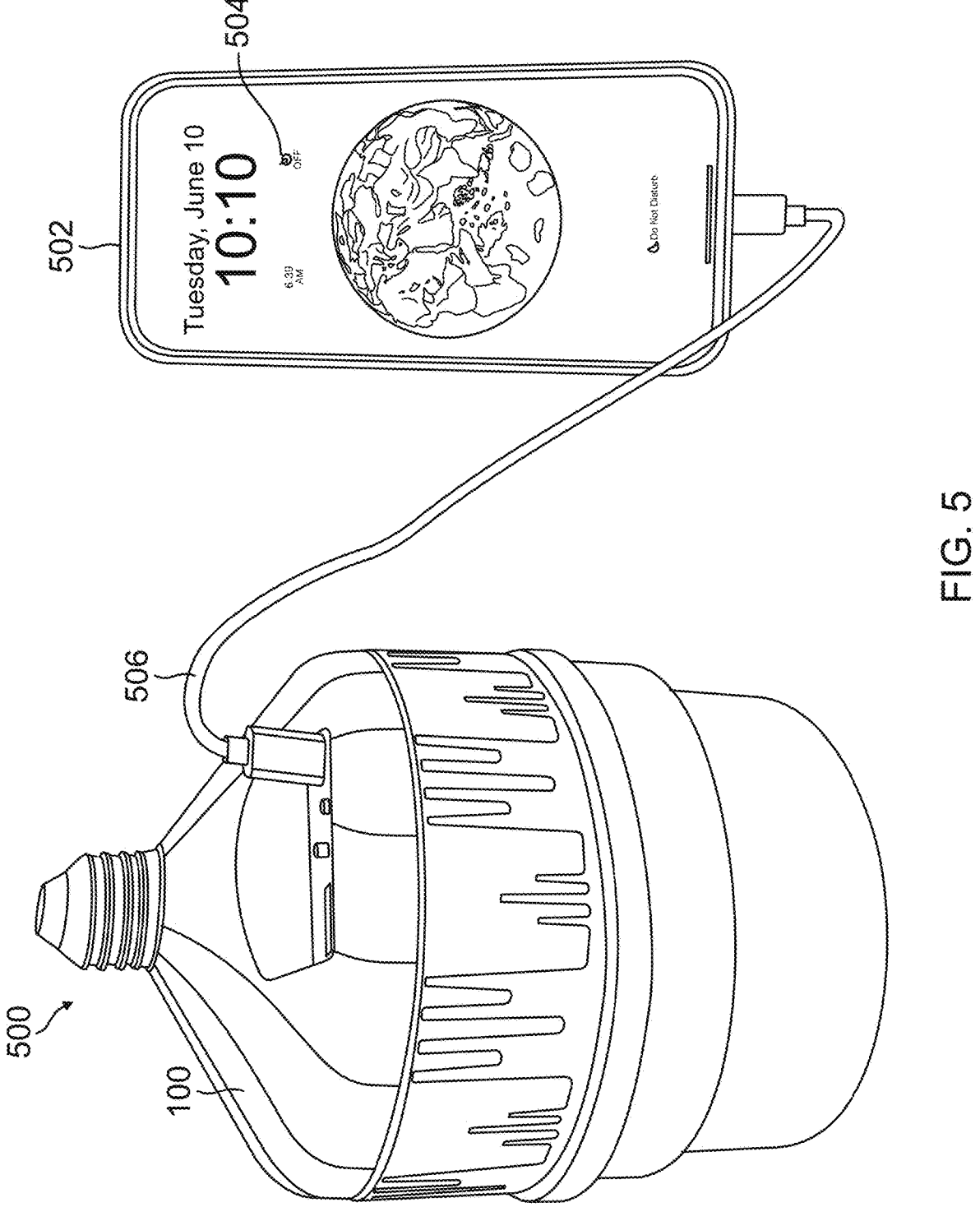
FIG. 5 illustrates a system that includes a lightbulb having a mobile device, which is attached to the lightbulb by a cord.

FIG. 5 illustrates a system 500 which includes the lightbulb 100 having mobile device 502, which is attached to the lightbulb 100 by the cord 506. The lightbulb 100 can be recharged by the mobile device 502. The mobile device 502 can power the lightbulb 100. The mobile device 502 includes an interface 504, which may provide status information about the lightbulb 100. Alternatively, or additionally, the interface 504 can be used to send commands to control the lightbulb 100.

Figure 6:
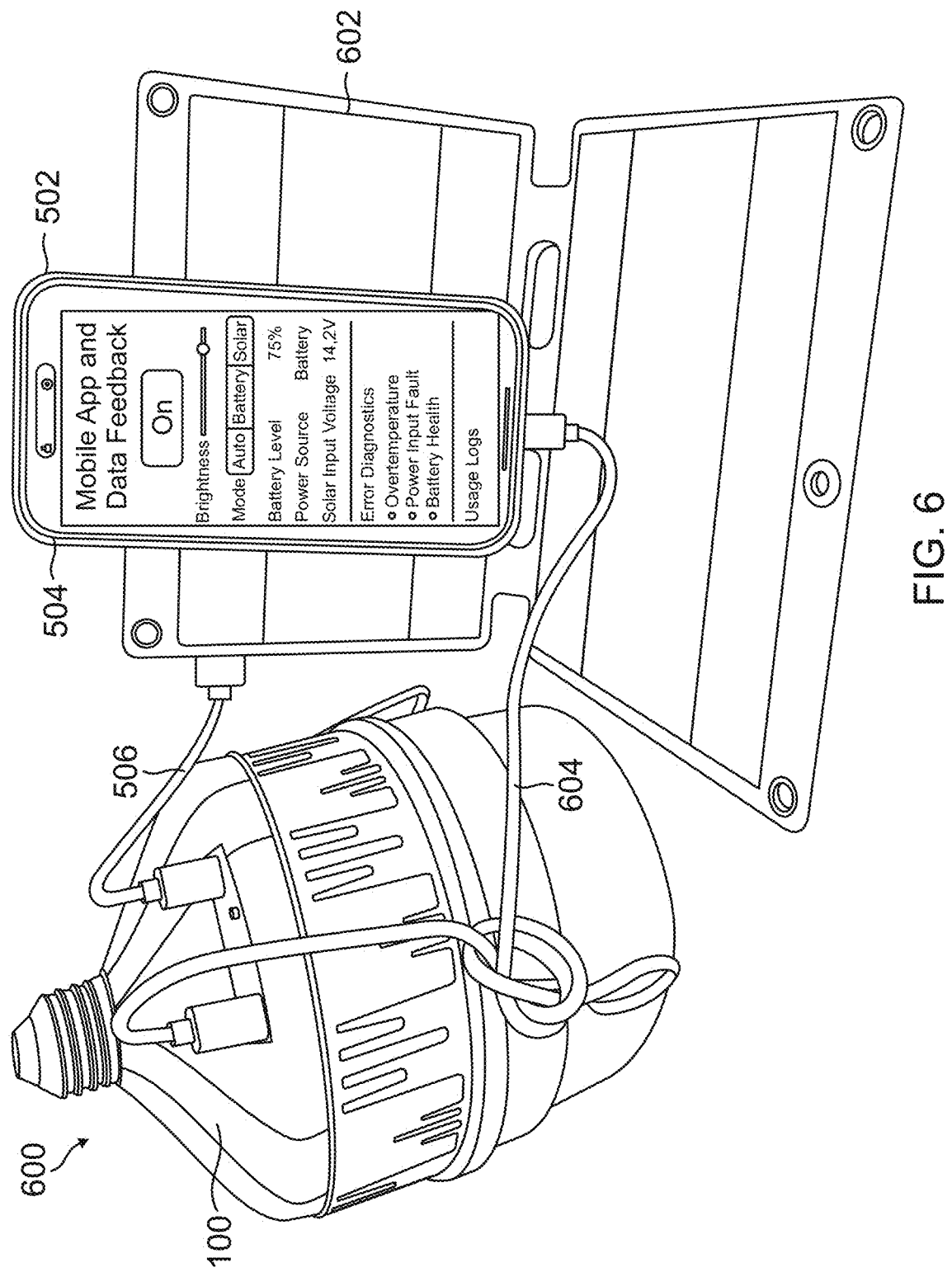
FIG. 6 illustrates a system, which includes the lightbulb, having the mobile device, the cord, the interface, a solar cell and a cord.

FIG. 6 illustrates a system 600 which includes the lightbulb 100, having the mobile device 502, the cord 506, the interface 504, a solar cell 602 and a cord 604. In some embodiments, the solar cell 602 is a foldable solar panel. In some embodiments, the cord 604 is a communications cord, allowing the flow of information and commands between the mobile device 502 and the lightbulb 100.

The interface 504 includes (1) indications of the temperature, (2) whether or not there is an electrical fault, (3) a remaining life of the internal and/or external batteries, (3) the voltage currently being supplied by the power source, (4) which power source is currently connected for powering the lightbulb 100, (5) an interface for selecting the mode of operation, (6) an input for dimming the lightbulb 100, (6) usage logs and (7) error diagnosis. In some embodiments, lightbulb 100 supports mobile application integration via USB PD data channels (USB-C connected devices) or wireless communication (e.g., Bluetooth Low Energy). The functions of the application associated with interface 504 include a remote on/off control (or setting), brightness control (or adjustment, allowing the brightness to be adjusted), and mode control (e.g., the mode control determines whether the power source is determined automatically, whether the power source is supplied by the USB interface, a battery or a solar panel). In some embodiments, the interface 504 provides a real-time display of the battery level, the charge status, an indication of which power source is active (AC, USB, Battery, Solar) and the rate at which the solar panel charges the battery. The error diagnosis includes indications of operational and diagnostic data, such as whether the temperature is too high, whether the power input has a fault, the battery health, estimated power consumption, charging circuit errors and logs of usage events. Some usage events include a history of the switching between power sources, records of runtimes and dimming adjustments. In some embodiments, the interface 504 provides fields for entering and receiving communications with the controller, enabling user-initiated control and system-initiated status reporting, and allowing the user to transmit operational instructions. The bidirectional control helps ensure proactive maintenance, especially in critical or remote deployments.

Figure 7:
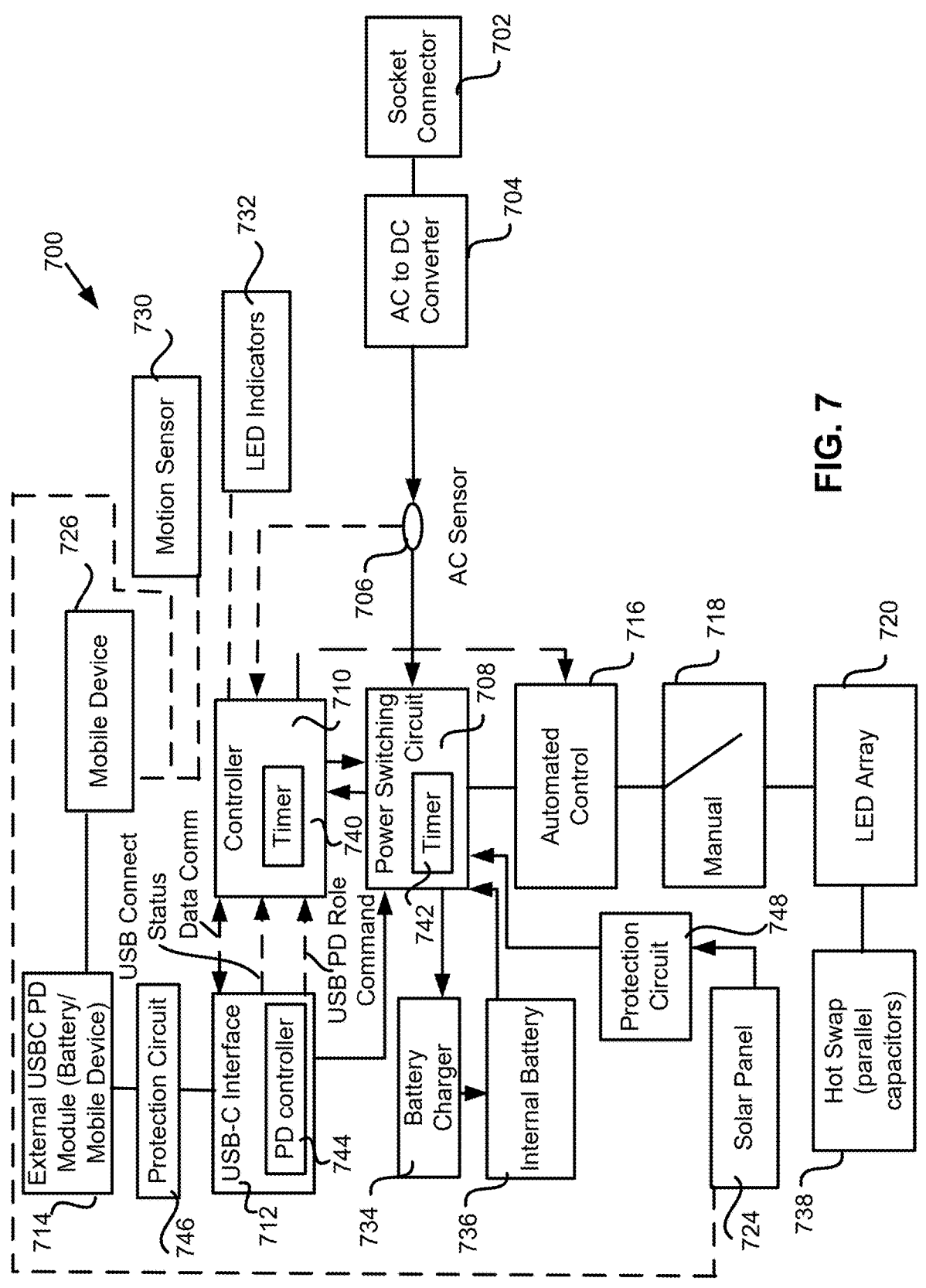
FIG. 7 illustrates an embodiment of a circuit for the lightbulb.

FIG. 7 illustrates an embodiment of a circuit 700 for the lightbulb 100 (or a "lighting system"). In the FIGs. that follow, dashed lines indicate electrical or other connections (e.g., wires or "lines") that carry control and communications signals. In some embodiments, optical connections (e.g., optical fibers) carry control and communications signals. Solid lines indicate electrical connections (e.g., wires or "lines") that carry power.

In some embodiments, the lightbulb 100 includes an AC socket connector 702 connected to an AC-to-DC converter 704. In some embodiments, the AC socket connector 702 is a lightbulb socket connector 102. The AC-to-DC converter 704 converts AC electricity from the AC socket connector 702 to DC electricity for powering the lightbulb 100.

The AC sensor 706 detects whether the AC electricity is being supplied via the AC socket connector 702, such as by detecting the voltage at the DC end (or DC output) of the AC-to-DC converter 704. In some embodiments, the AC sensor 706 includes a zero-crossing detector (e.g., using an opto-isolator such as the PC814 or HCPL-817) or a voltage divider with a comparator for detecting when the current and/or voltage is zero.

A power switching circuit 708 routes power and switches which power source is connected to the rest of the circuit 700 to power the light source of the lightbulb 100. The power switching circuit 708 switches between providing power to the USB connectors and withdrawing power from the USB connectors, based on input from the AC sensor 706 and the controller 710.

In some embodiments, the power switching circuit 708 is controlled by the controller 710. In some embodiments, the controller 710 determines which power source is connected to the rest of the circuit 700 for providing power. Based on that determination, the controller 710 sends signals to the power switching circuit 708 to cause the power switching circuit 708 to connect the power source that the controller 710 determined would provide power. The power switching circuit 708 communicates (via communications) with the controller 710, informing the controller 710 which power source is currently providing power to lightbulb 100. In some embodiments, controller 710 determines the direction and timing of communications and power flows. In some embodiments, different power sources connect to different connectors/ports of the power switching circuit 708, and the power switching circuit 708 determines which power source is connected and is providing power based on the available power capacity of one or more power sources, system demand and the connection, via which the power is received. In some embodiments, the power source that connects to the USB-C interface 712 is distinguished from other power sources that connect to the USB-C interface 712 by the voltage and current setting to which the USB-C interface 712 is set. In some embodiments, which device connected to the USB-C interface 712 communicates with the USB-C device via the USB-C interface 712 to the power switching circuit 708 and then to the controller 710. In some embodiments, the device that connects to the USB-C interface 712 communicates (via communications) directly with the USB-C device via the USB-C interface 712 to the controller 710.

In some embodiments, controller 710 stores machine instructions in a memory system having a non-transient memory. In some embodiments, controller 710 invokes logic implemented by logic circuits associated with the controller 710. In this specification, the term "logic" is generic to hardware (e.g., a logic circuit) and software. U.S. Pat. No. 6,785,872, entitled "Algorithm-to-hardware system and method for creating a digital circuit," is a system that converts an algorithm to a circuit, which may be used to convert software for controlling the controller 710 into hardware for performing the same functions. U.S. Pat. No. 6,785,872 is hereby incorporated into the specification by reference. In some embodiments, the logic invoked by the controller 710 is software stored on a non-transient memory system that is run by the controller 710. In some embodiments, the logic invoked by the controller 710 is a special-purpose processor or a special-purpose logic circuit, such as an ASIC (Application Specific Integrated Circuit) or a programmed FPGA (Field Programmable Gate Array).

In some embodiments, the controller 710 runs logic that detects faults. In some embodiments, the controller 710 turns off the power interface associated with the fault. In some embodiments, the controller 710 tracks the AC power status via an input pin. In some embodiments, the controller 710 invokes logic that coordinates role switching using an algorithm represented by the following pseudo-code:

```
if (AC_present) {
    configure_PD_role (SOURCE);
    enable_USB_output ( );
} else {
    configure_PD_role (SINK);
    if (USB_device_connected ( ) {
        negotiate_PD_contract ( );
        enable_USB_input ( );
    }
}
```

In some embodiments, the controller 710 monitors the VBUS voltage (VBUS is the USB voltage), the current draw, and user-set thresholds to determine the direction of power flow. In some embodiments, the controller 710 includes a data communications controller. The controller 710 provides signals to a visual indicator indicative of the state of the lightbulb 100. In some embodiments, the controller 710 also receives signals from external sources (e.g., external USB PD devices) to determine which power source powers the lightbulb 100. The AC sensor 706 is interfaced with the controller 710. The controller 710 continuously monitors the AC sensor 706, and the AC sensor 706 continuously monitors the presence or absence of power at the AC socket connector 702, so that the controller 710 continuously monitors the power flowing through the AC socket connector 702. In some embodiments, after loss of AC power for a threshold duration of time (e.g., for more than 10 ms), the controller 710 triggers a transition signal, and the lightbulb 100 automatically switches to the backup power source without noticeable delay (typically <20 ms), ensuring uninterrupted lighting. In some embodiments, the controller 710 has its own internal battery, which in some embodiments is charged by a battery charger. In some embodiments, the power switching circuit 708 supplies a constant voltage and a constant current to the controller 710. In some embodiments, the power switching circuit 708 routes power from different power sources to LED array 720, based on signals from the controller 710.

The controller 710 decides which one of the power inputs powers the LED array 720. The controller 710 decides how much of the current/power of the current power source is used for powering the LED array 720. The controller 710 activates a dimming function and/or an on/off function. For example, the mobile device 726 controls the circuit 700 based on input received at interface 504, causing the mobile device 726 to send communications, such as USB commands (e.g., USB PD communications), to the controller 710. In some embodiments, controller 710 interfaces with a solar power 724, a mobile device 726, external power 728 (e.g., an external battery, which in some embodiments is an external USB PD device), a motion sensor 730 and the LED indicators 732 (providing visual indications) to determine which power source to use and what visual indications to provide to the user.

The controller 710 exchanges data communications, status communications, and USB PD role commands with the USB-C interface 712 by the USB PD controller 744. In some embodiments, the USB-C interface 712 is configured/includes logic to support bidirectional USB Power Delivery (PD) communications and dynamic role negotiation. The USB-C interface 712 enables the system to function either as a power source (power provider) or a power sink (power consumer) based on the availability of AC input and internal battery charge status (as determined by the controller 710). In some embodiments, the USB-C interface 712 is a combined mechanical structure, electrical circuitry, and logical circuitry that enables PD-compliant power and/or data communication through a USB Type-C port. The USB-C interface 712 includes a USB-C receptacle, one or more PD controller ICs (USB PD controller 744), power path switches, current sensing elements, and protection circuits, all integrated into the lightbulb 100's power management framework. In some embodiments, the USB-C interface 712 supports CC1/CC2 communication lines. In some embodiments, the External battery modules with external battery modules with USBC PD interface module 744 (e.g., STUSB4500, IP2726, or FUSB302B) is responsible for handling role negotiation, power contract selection, and PD message encoding/decoding. In some embodiments, the USB-C interface 712 includes an MCU interface (e.g., I²C or GPIO) for dynamic reconfiguration and monitoring. Devices compliant with the USB-C interface 712 participate in a handshaking process in which the device connecting to the USB-C interface 712 informs the PD controller ICs (External battery modules with USBC PD module 744) of the voltage and current level required by the device, and the PD controller ICs set the USB-C interface 712 to the voltage and current needed by the device.

The external USB PD module (battery/mobile device) 7*14 is an embodiment of the external battery chamber 302 that has the USB interface 712. For example, the interface accepts a 5-Volt, 6-Volt, 9-Volt and/or 12-Volt battery stack.

The automated control 716 modulates the current, automatically dims and turns on and off the LED array 720, based on whether the lightbulb 100 is connected to a lightbulb socket via the AC socket connector 702 and/or an external power source 728. The power from the power switching circuit 708 travels to the LED array 720, via the automated control 716 (which is controlled by the controller 710). In some embodiments, the automated control 716 is based on remote commands (from the controller 710).

The manual switch 718 can be used to manually turn (or set) on or off the light source of the lightbulb 100. The circuit 700 need not include both the automated control 716 and the manual switch 718. In some embodiments, the manual switch 718 includes a dimmer switch for dimming the lightbulb 100. In some embodiments, the manual switch 718 has a manual user interface having (1) one or more pushbuttons, (2) one or more rotary dials and/or (3) one or more capacitive touch inputs. The manual user interface allows direct control over power modes and brightness levels, independent of logic that automatically selects power sources.

The manual switch 718 is downstream from the automated control 716. In some embodiments, the manual switch 718 performs the same functionality as the automated control 716 (dimming the LED array 720 and turning the LED array 720 on and off). Additionally, in some embodiments, the manual switch 718 allows the user to override the settings of the automated control 716.

In some embodiments, the manual switch 718 includes a single onboard switch or multi-function dial that allows the user to (1) cycle through power modes (Auto, Battery, USB) with short presses, and then when the appropriate power mode is found, to stop on that choice and (2) adjust brightness through long presses or rotary movement, enabling multiple dimming levels or smooth ramping.

In some embodiments, the brightness level selected by the manual switch 718 (or an external application) is stored in non-volatile memory and restored after power loss or mode change. In some embodiments, (1) the manual switch 718 settings (for mode and brightness) take priority over the wall switch, (2) the manual switch 718 acts as a master power toggle/control but does not override dimming or mode settings and (3) when the AC power is restored, the lightbulb 100 resumes (or reverts to) the last user-defined state rather than defaulting to full brightness or auto mode. This prioritization promotes a behavior of the lightbulb 100 that is consistent with the user-intended behavior, even when the AC power is turned on and off frequently.

The LED array 720 is the light source of lightbulb 100 (in other embodiments, the LED array 720 is replaced with another light source. In some embodiments, the hot swap 722 allows the power source for the LED array 720 to be replaced without shutting off the lightbulb 100. In some embodiments, the hot swap 722 prevents the lightbulb 100 from flickering when switching between power sources.

In some embodiments, the solar panel 724 is the solar cell 602. The controller 710 monitors solar input voltage via an ADC or comparator. When valid solar input is detected (e.g., >6V), charging the internal battery is prioritized. The internal battery is charged through a buck or buck-boost charger (e.g., BQ24133, CN3791). The solar panel 724 directly powers the lightbulb 100 if the battery is full or a bypass mode is enabled.

The mobile device 726 can be the mobile device 502, which in some embodiments is a mobile phone. In other embodiments, mobile device 726 is a laptop, tablet or other mobile device.

In some embodiments, the external power 728 can be provided by the mobile device 502 and/or the external battery source 302. The brightness of the LED array 720 is controlled by the current flowing through the LED array 720. The current across the LED array 720 can be increased by increasing the voltage of the power source. For example, a resistor or buck converter can be placed in series with the LED array 720. Then, as the voltage across the combination of the LED array 720 and the resistor is increased, the voltage across the resistor increases, thereby increasing the current to the LED array 720, while the voltage across the LED array 720 remains essentially constant. Similarly, if the input voltage is increased, the buck converter increases the current (thereby increasing the brightness of the LED array 720) while keeping the voltage constant or relatively constant.

The motion sensor 730 detects the motion of the lightbulb 100, which could be an indication that the lightbulb 100 has been disconnected from the AC power. In some embodiments, the motion sensor 730 is an embedded Passive Infrared (PIR) motion sensor, enabling motion-triggered lighting when operating on battery power. When AC power is unavailable, the controller 710 enters a low-power standby mode and, in some embodiments, activates the LED array 720 only upon detecting motion within a defined range (e.g., 3-5 meters). The low-power mode conserves battery life during idle periods and is especially suited for emergency or outdoor use cases. In some embodiments, the PIR sensor (e.g., HC-SR505 or EKMC1601111) is integrated into the housing 116. In some embodiments, the duration of the motion that triggers motion sensor 730 and the sensitivity of the motion sensor 730 are set/preset by the controller 710. In some embodiments, input to the motion sensor 730 overrides the manual switch 718 and the automated control 716.

In some embodiments, the battery charger 734 charges the internal battery 736 and/or the external power 728. In some embodiments, the internal battery 736 is automatically charged by battery charger 734 when AC power is present or upon restoration of AC power, regardless of the status/state of the manual switch 718. In some embodiments, internal battery 736 and external batteries (e.g., external power 728) are independently chargeable from the AC power source. In some embodiments, internal battery 736 and external power can recharge one another (e.g., via USB-C interface 712). In some embodiments, internal battery 736 has a nonremovable chamber. In some embodiments, internal battery 736 is a non-removable.

In some embodiments, the LED indicators 732 are disposed on the housing 116 and include indicators of which power source is supplying power, an indicator of whether a fault was detected and an indicator of whether the temperature is higher than a threshold value. In some embodiments, the LED indicators 732 include a multi-color LED or an RGB (Red, Green, Blue) LED to represent different modes (e.g., green for AC, blue for USB, red for battery). In some embodiments, one or more of the LED indicators 732 flash to indicate events such as charging, source switching, or fault conditions. In some embodiments, the LED indicators 732 include a segmented LED bar to indicate the battery's state-of-charge during or after a button press. In some embodiments, during user interaction, short LED flashes confirm button inputs (e.g., mode changes). In some embodiments, the LED indicators 732 include a brightness ramp corresponding to dimming adjustments. In some embodiments, the LED indicators 732 are turned off, avoiding light pollution during normal illumination, and are only activated when triggered by user input or system events. In some embodiments, the LED indicators 732 include an OLED (Organic Light Emitting Diode) display for textual feedback and backlit icons molded into the housing 116. In some embodiments, the LED indicators 732 include backlit icons molded into the housing 116.

In some embodiments, the circuit 700 includes a protection circuit 746 or 748 that protects the lightbulb 100 from surges and voltage spikes (providing surge protection). In some embodiments, protection circuits 746 and 748 prevent backflow and overcurrent. In some embodiments, input lines include Schottky diodes or ideal diode controllers (e.g., LT (4412) for current sense resistors and overvoltage clamps (e.g., TVS diodes) to protect the power switching circuit 708. In some embodiments, protection circuits 746 and 748 include smart load switch ICs with built-in protection (e.g., TPS22976).

Figure 8:
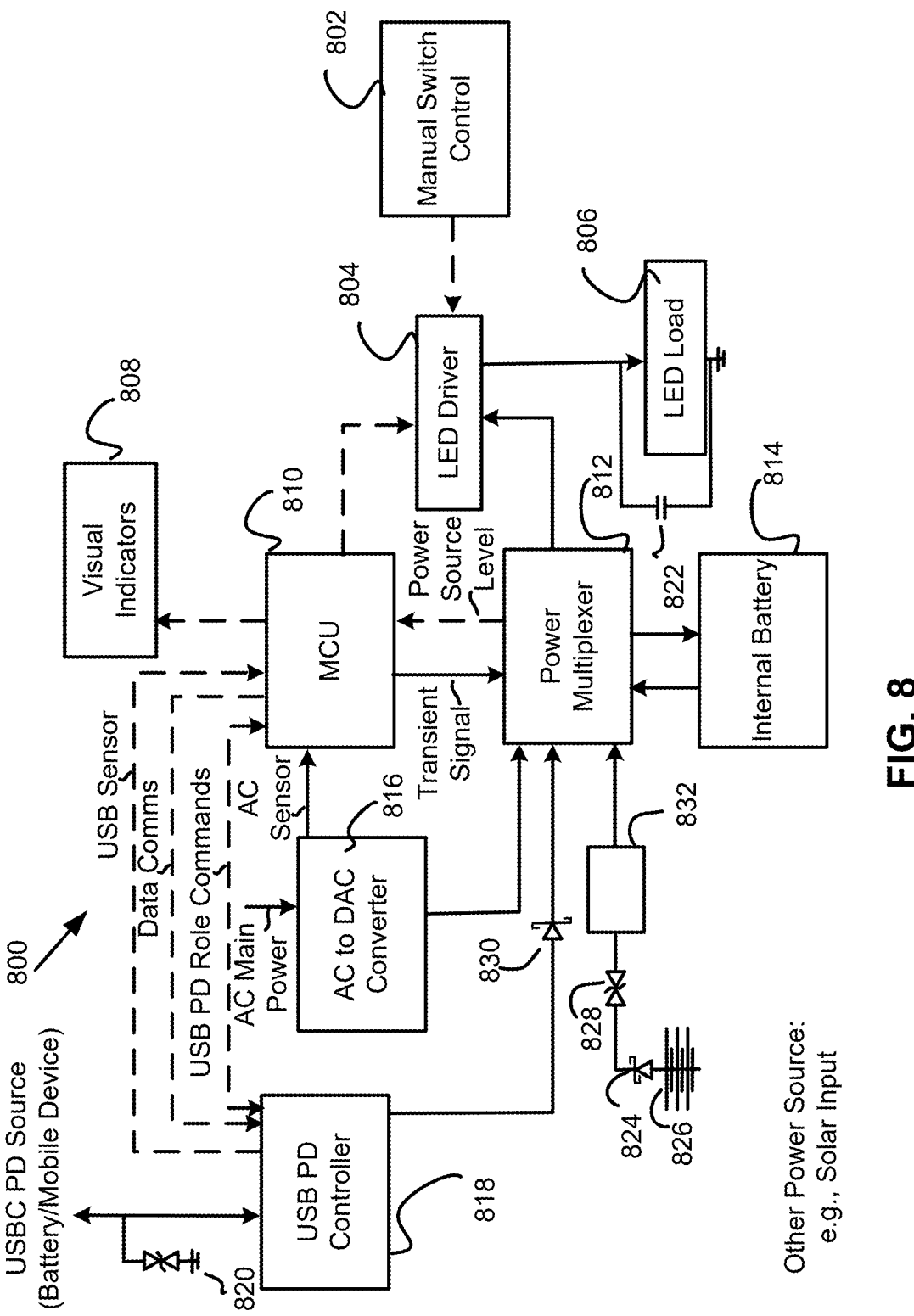
FIG. 8 illustrates a block diagram of an embodiment of the circuit FIG. 7.

In some embodiments, the TVS diodes 820 and 828 clamp the voltage and protect the rest of the lightbulb 100 from surges and overvoltages by maintaining a constant voltage, which is an embodiment of the protection circuit 746 and 748 (see FIG. 8). In other embodiments, the protection circuits 746 and 748 include one or more of an avalanche diode, discharge tube, Schottky diode, TVS (Transient Voltage Suppression) diode, and/or capacitor in addition to or instead of TVS diode 820. The combination of the Schottky diodes 824 and 830 protects circuit 700 from reverse voltages and forms part of the protection circuits 746 and 748. In other embodiments, Zener diodes and/or buck converters can be used instead of or in addition to TVS diodes. In some embodiments, the power line carrying power from the USB-C interface 712 to the power switching circuit 708 includes a Schottky diode to protect against reverse voltages. In some embodiments, the power line for canning power from power switching circuit 708 to USB-C interface 712 also has a Schottky diode to prevent reverse voltages in the opposite direction.

The power source 826 includes the solar panel 724, the external power 728 and/or the mobile device 726. If the AC power is not present, the load path to the LED array 720 is routed through a synchronous buck converter or buck-boost converter 832 (e.g., MP2359 or TPS62125), which can accept a variety of DC inputs from the external power 728 or the USB-C interface 712. The buck converter regulates the input to maintain a constant voltage across the LED array 720, suitable for the LED driver. The USB-C interface 712 is configured to have the Source Role, during which the USB-C interface 712 delivers power to an attached USB PD-compliant device, such as a smartphone. The USB-C interface 712 is "interoperable" with a variety of powers sources and devices. In some embodiments, the lightbulb 100 negotiates output voltage (typically 5V/9V) using a USB PD protocol controller (e.g., External battery modules with external battery modules with USBC PD Interface 744) and provides regulated output via a synchronous buck converter (e.g., MP2759, TPS25750 with external FETs).

If an AC power loss is detected, the controller 710 configures the USB-C interface 712 to the sink role. If a power bank or mobile phone is connected, the system negotiates power input (e.g., 5V/3A or 9V/2A) to charge the internal battery or power the LEDs. This is achieved through USB PD sink negotiation using PD controller 744.

In some embodiments, the hot swap 738 allows the power source to be changed (e.g., between the AC socket connector 702, the solar panel 724, the external power 728 and the internal battery 736) without turning off the lightbulb 100. During transitions, such as disconnecting a USB PD power bank or replacing an external battery pack, the capacitor supplies a short-duration current to maintain uninterrupted LED output and prevent flicker or power dropout. The hot swap 738 buffers energy and discharges into the load during swap events, managing inrushes of current and isolating the LED array 720 from transient electrical phenomena. The hot swap 738 enables a seamless user experience, reduces the need for a full reboot, light reinitialization and resetting the controller 710 during source transitions after a hot swap. In some embodiments, the hot swap 738 is implemented by placing one or more capacitors in parallel with the LED array 720. The capacitor(s) of the hot swap 738 store a charge capable of powering the LED array 720 for a short time and are thus capable of compensating for a voltage drop during the swap. In some embodiments, the hot swap 738 includes a supercapacitor or low-ESR (low Equivalent Series Resistance) capacitor (e.g., tantalum or ceramic, e.g., 470-1000 μF), connected in parallel with the LED driver. For example, in some embodiments, the hot swap 738 includes a supercapacitor (e.g., 10F, 2.7V). In some embodiments, the capacitor is integrated with load switch ICs (e.g., TPS22990).

The capacitor 822 is an embodiment of the hot swap 738 (see FIG. 8). In some embodiments, the hot swap 738 also includes a transistor to switch between (1) charging the capacitor 822 by a power source and (2) discharging the capacitor 822 to power the LED array 720.

In some embodiments, the timer 740 or 742 times how long the LED array 720 remains lit after the lightbulb 100 is disconnected from the AC power. See U.S. patent application Ser. No. 19/047,017 regarding the functioning of the timer 740 or 742 and regarding the functioning of the lightbulb 100.

FIG. 8 illustrates a block diagram of circuit 800, which is an embodiment of the circuit 700. The manual switch control 802 is an embodiment of the manual switch 718. The combination of the LED driver 804 and the LED load 806 is an embodiment of the LED array 720. The LED indicators 732 are an embodiment of the visual indicators 808.

The MCU (Micro-Controller Unit) 810 is an embodiment of the controller 710, which in some embodiments, includes a system of one or more processors. In some embodiments, the MCU 810 is an STM32G0 or PY32F002B. The MCU 810 reads the AC status via a digital input pin.

Booting up the MCU 810 initializes pin states and configures interrupts from the AC sensor line. If AC power is on, the MCU 810 enables the AC path via a relay or TRIAC (e.g., BT136) and disables other paths. If AC power is lost, the MCU 810 executes a routine to switch power (e.g., PowerSwitchTo (SecondarySource)), where the SecondarySource is selected based on (1) the presence and voltage level from USB PD handshake (via a PD sink controller, e.g., STUSB4500 or IP2726), (2) battery State of Charge (SoC) from a fuel gauge (e.g., BQ27441). The MCU 810 sets appropriate MUX/enable pins to route the selected power source to the LED load 806 and internal charging logic. In some embodiments, Status LEDs or UART logs can be triggered by MCU 810 to indicate the source switch.

The power multiplexer 812 is an embodiment of the power switching circuit 708 and, in some embodiments, includes a multiplexer that switches which power interface or power source is connected to the LED array 720. In some embodiments, the power multiplexer 812 is a set of solid-state switches or load switch ICs. For example, the power multiplexer 812 can be a TPS2121 automatic power MUX and can be used to seamlessly switch between the external USB connector 712 and battery inputs based on preset priorities. For example, in one embodiment, the AC socket connector 702 is prioritized over the USB-C interface 712, which in turn is prioritized over a battery. The lightbulb 100 attempts to draw from USB PD before falling back to battery. This set of priorities is useful in cases where a phone or power bank is nearby. As another example, the AC socket connector 702 is prioritized over a battery, which in turn is prioritized over the USB-C interface 712. This embodiment is suitable for grid-outage survival scenarios. As another embodiment, a manual override is included in the lightbulb 100. The MCU 810 allows user access to a GPIO (General Purpose Input/Output) connection, which is mapped to a user button or BLE-connected application to manually override default priorities.

Alternatively, the power multiplexer 812 is a discrete set of P-channel/N-channel MOSFETs (e.g., IRF7413, S14431) and can be arranged in an ideal diode-OR configuration with MCU-controlled gates to isolate and select input paths. The internal battery 814 is an embodiment of the internal battery 736. The AC-to-DC converter 816 is an embodiment of the AC-to-DC converter 704. The External battery modules with external battery modules with USBC PD Interface 818 is an embodiment of the USB-C interface 712. The Schottky diode 824, the TVS diode 828 and the buck converter 832, protection circuits 746 and 748 were discussed above in conjunction with FIG. 7.

Figure 9:
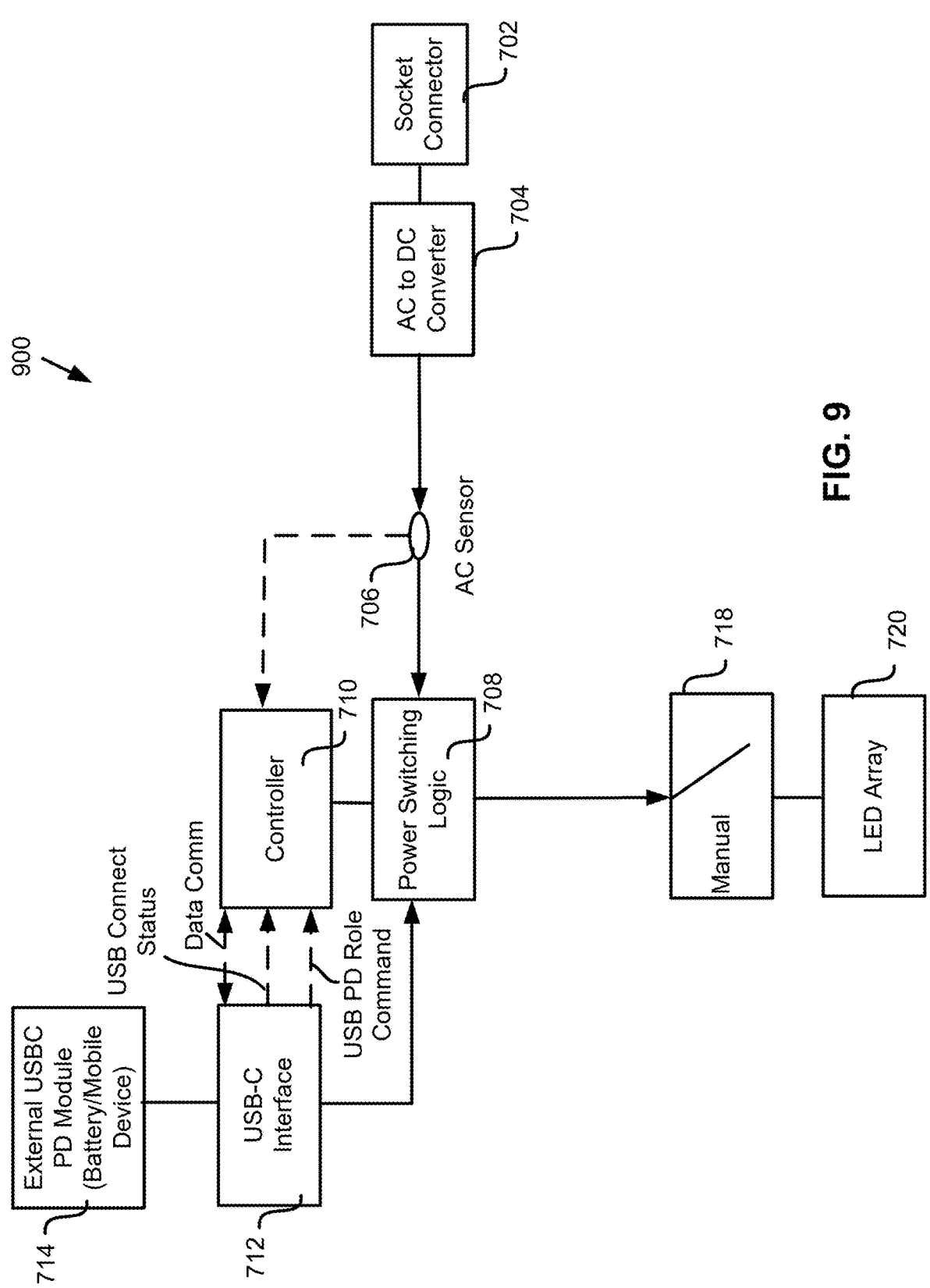
FIGS. 9-12 illustrate various embodiments that can be carved out of FIG. 7, which are discussed in FIGS. 13-16, respectively.
Figure 10:
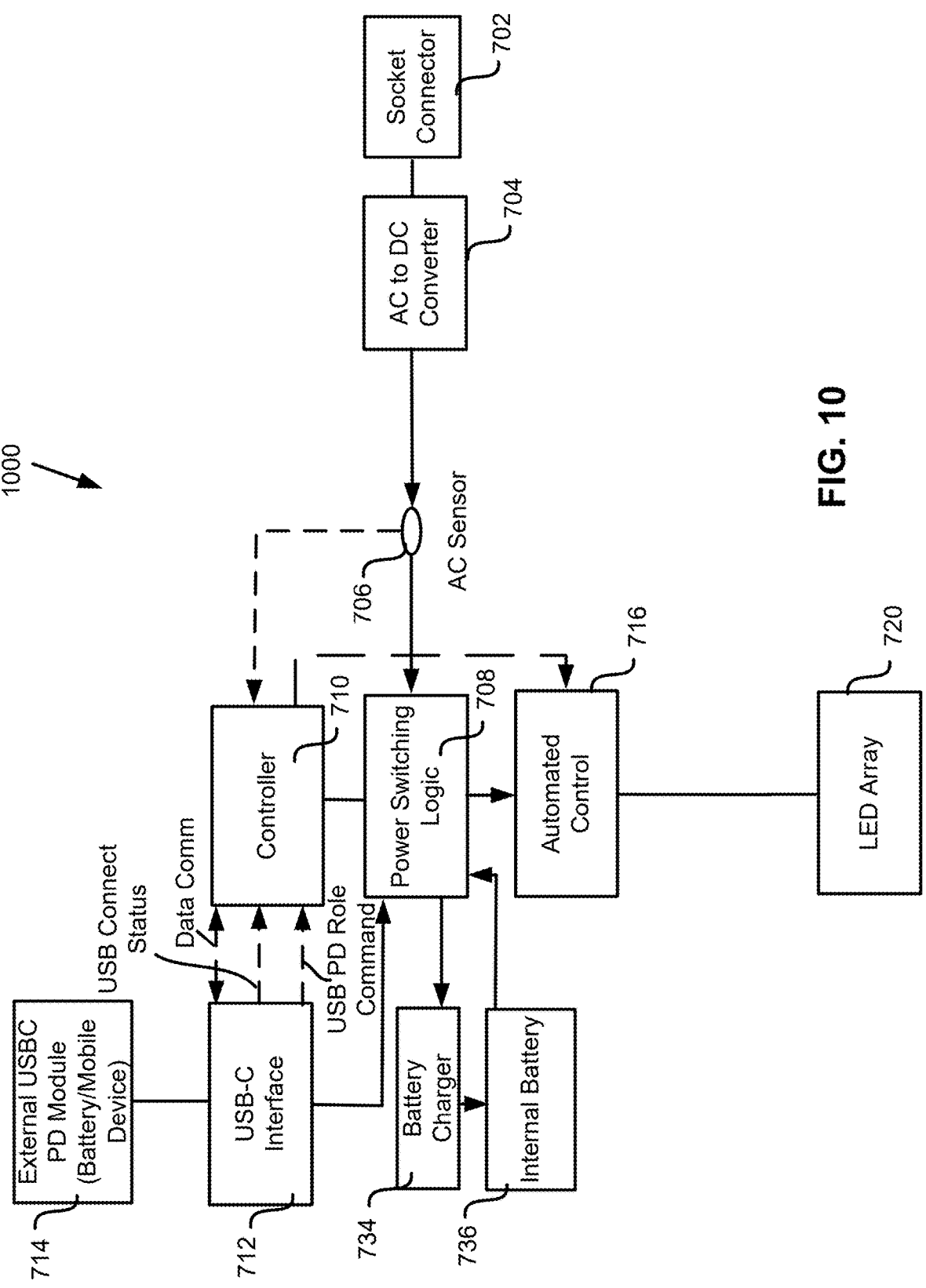
Figure 11:
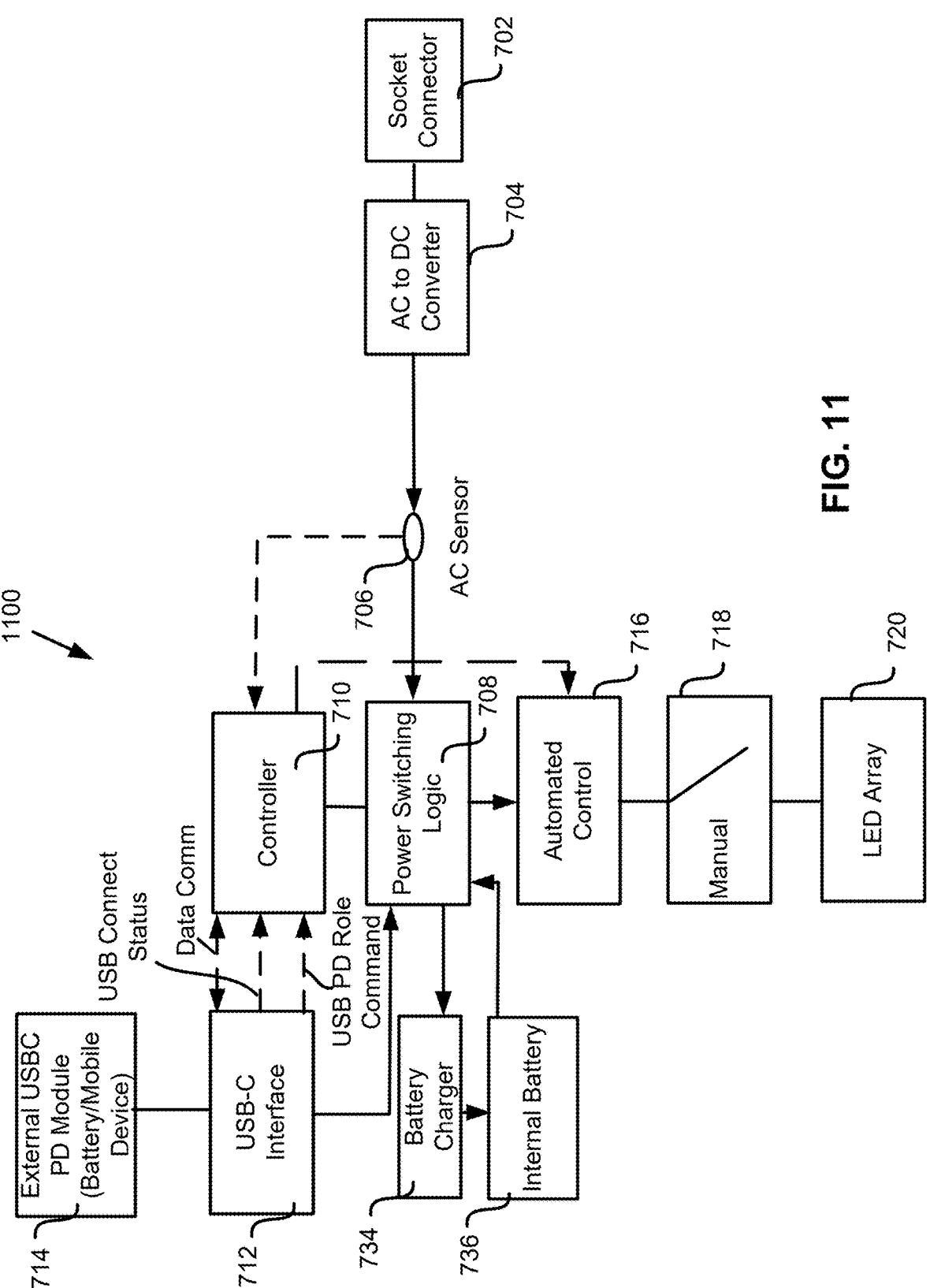
Figure 12:
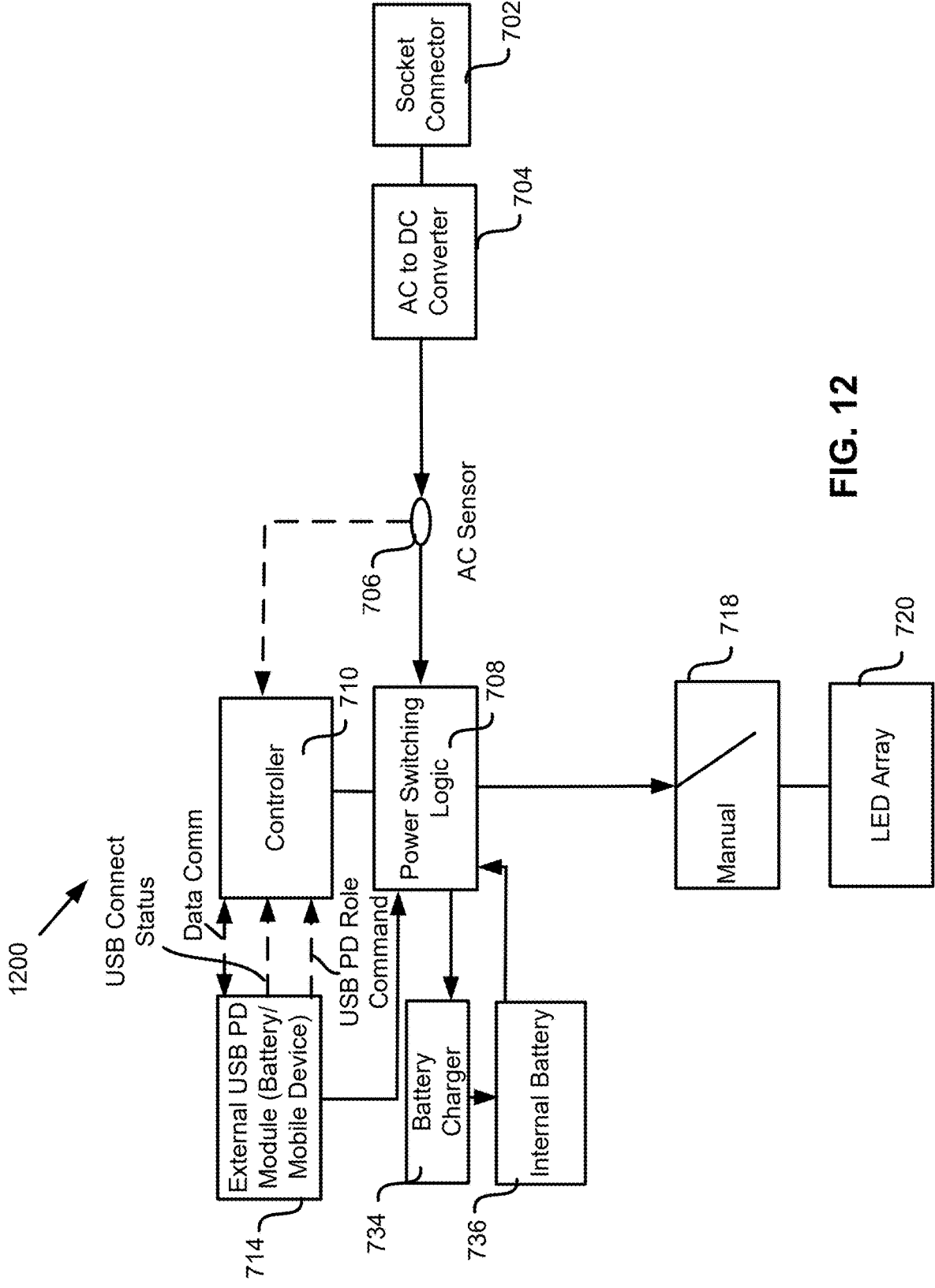

FIGS. 9-12 illustrate various embodiments that can be carved out of FIG. 7, which are discussed in FIGS. 13-16, respectively. FIGS. 9-12 illustrate embodiments in which the lightbulb 100 automatically switches between the AC power source and another power source. In the embodiment of FIG. 9, the other power source is external to the lightbulb 100 and connected to the lightbulb by the USB-C interface 712. In the embodiment of FIG. 10, there are two other power sources-one is external and one is internal to the lightbulb 100. However, the embodiment of FIG. 10 has an automated switch. The embodiment of FIG. 11 is similar to FIG. 10. However, the embodiment of FIG. 11 has a manual switch. The embodiment of FIG. 12 is similar to FIG. 11. However, the embodiment of FIG. 12 includes a manual switch. Any of the embodiments of FIGS. 9-12 may additionally include interfaces with the solar panel 724, the mobile device 726, the motion sensor 730, the LED indicators 732, the hot swap 738, the protection circuit 746 and/or the protection circuit 748.

Figure 13:
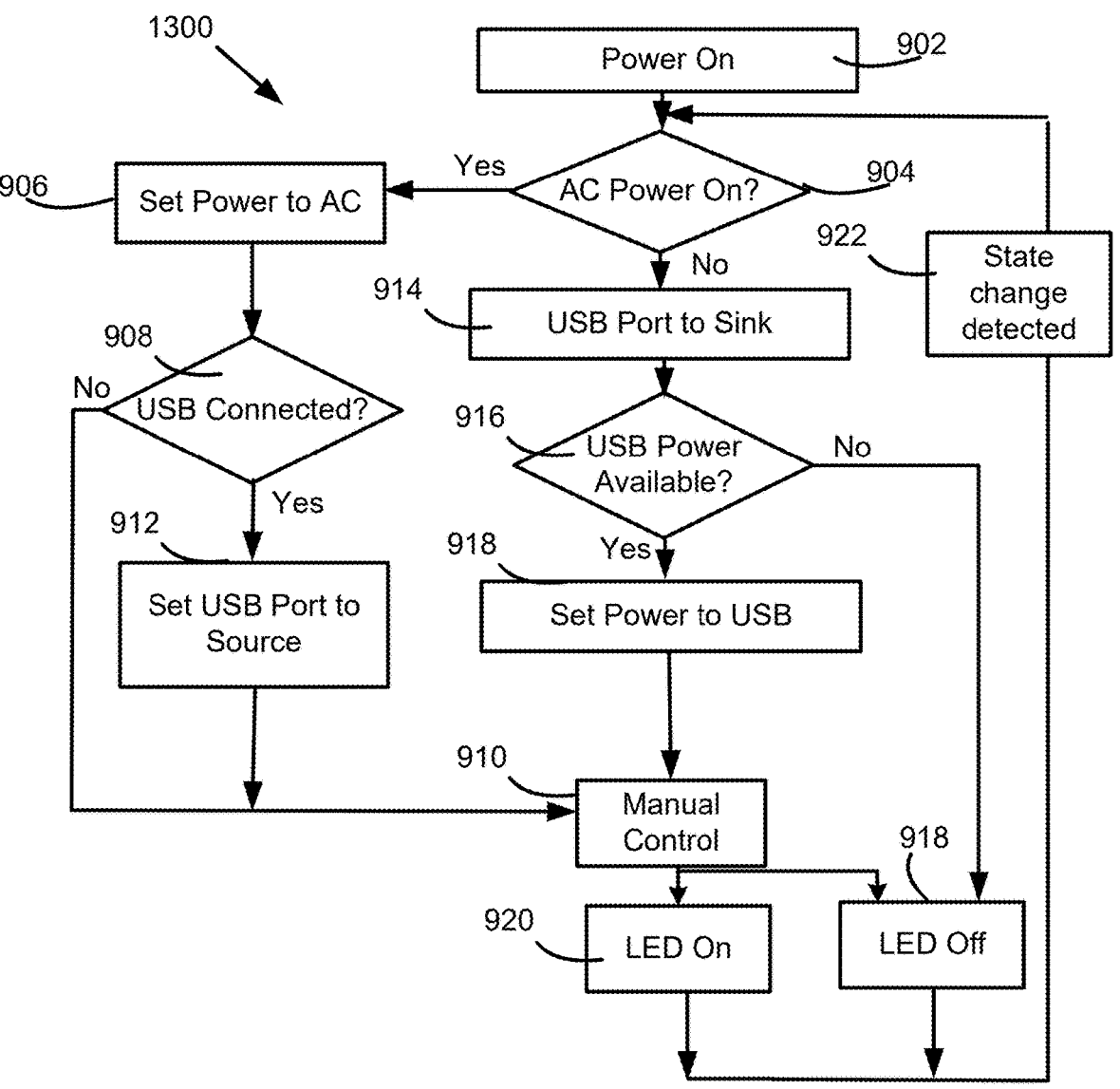
FIG. 13 illustrates a flowchart of an embodiment of a method of operating an embodiment of a lightbulb using the manual switch and without reliance on the internal battery.

FIG. 13 illustrates a flowchart of an embodiment of a method 1300 of operating an embodiment of the lightbulb 100 using the manual switch 718 and without reliance on the internal battery 736. Specifically, in some embodiments, the circuit that implements method 1300 only includes the AC socket connector 702, the AC-to-DC converter 704, the AC sensor 706, the power switching circuit 708, the controller 710, the USB-C interface 712, the manual switch 718 and the LED array 720 (see FIG. 9). Power is provided to the lightbulb 100 (step 1302). Power may be provided from any of a multitude of sources, which may include an AC light-bulb socket, via the AC socket connector 702, and an external Direct Current (DC) source, via the external USB connector 712, or the interfaces to the solar panel 724, the mobile device 726 or the external power 728. Next, a determination is made whether the AC power is connected, by the controller 710, based on the signals from the AC sensor 706 (step 1304). If AC power is being provided, then the source of powering the lightbulb 100 is set to the AC socket connector 702 (step 1306). Then, a determination is made by the controller 710 whether a USB device is connected (e.g., via the USB-C interface 712) (step 1308). If a USB device is not connected, the controller 710 sends a signal to the power switching circuit 708, and control is given by the power switching circuit 708 to the manual switch 718 (step 1310). If a USB device is connected (returning to step 1308), the power switching circuit 708 causes power to be provided to the USB port (e.g., the USB-C interface 712) (in step 1312), and then the method continues to step 1310. If the controller 710 determines that power for powering the lightbulb 100 is not being provided by the AC socket connector 702 (returning to step 1304), the power source is set to USB (e.g., to the USB-C interface 712) (step 1314). Then, the controller 710 determines whether USB power is available (e.g., at USB-C interface 712) (1316). If the controller 710 determines that no USB power is available, then the lightbulb 100 is placed in the off-state (step 1318). If the controller 710 determines that USB power is available (e.g., at USB-C interface 712), the method continues to step 1310. No matter which way the method arrives at step 1310, the lightbulb is turned on, and the power switching circuit 708 provides power to the LED array 720 (step 1320). The lightbulb 100 remains in the off state (the LED array 720 is not powered) (1318) or the on state (and the LED array 720 is powered) (1320) until the user changes the state of the lightbulb 100 with the manual switch 718. When the user changes the state of the lightbulb 100 with the manual switch 718, the lightbulb 100, via the controller 710, detects the state change (step 1322), and the method returns to step 1304.

If (returning to step 1304) the controller 710 determines that the power is not on, the USB port (e.g., USB-C interface 712) is set by power switching circuit 708 as a sink (step 1306), so that the lightbulb 100 can be powered, via USB-C interface 712, by an external USB device. Next, the controller 710 determines whether power is also being provided by a USB device (step 1308).

Figure 14:
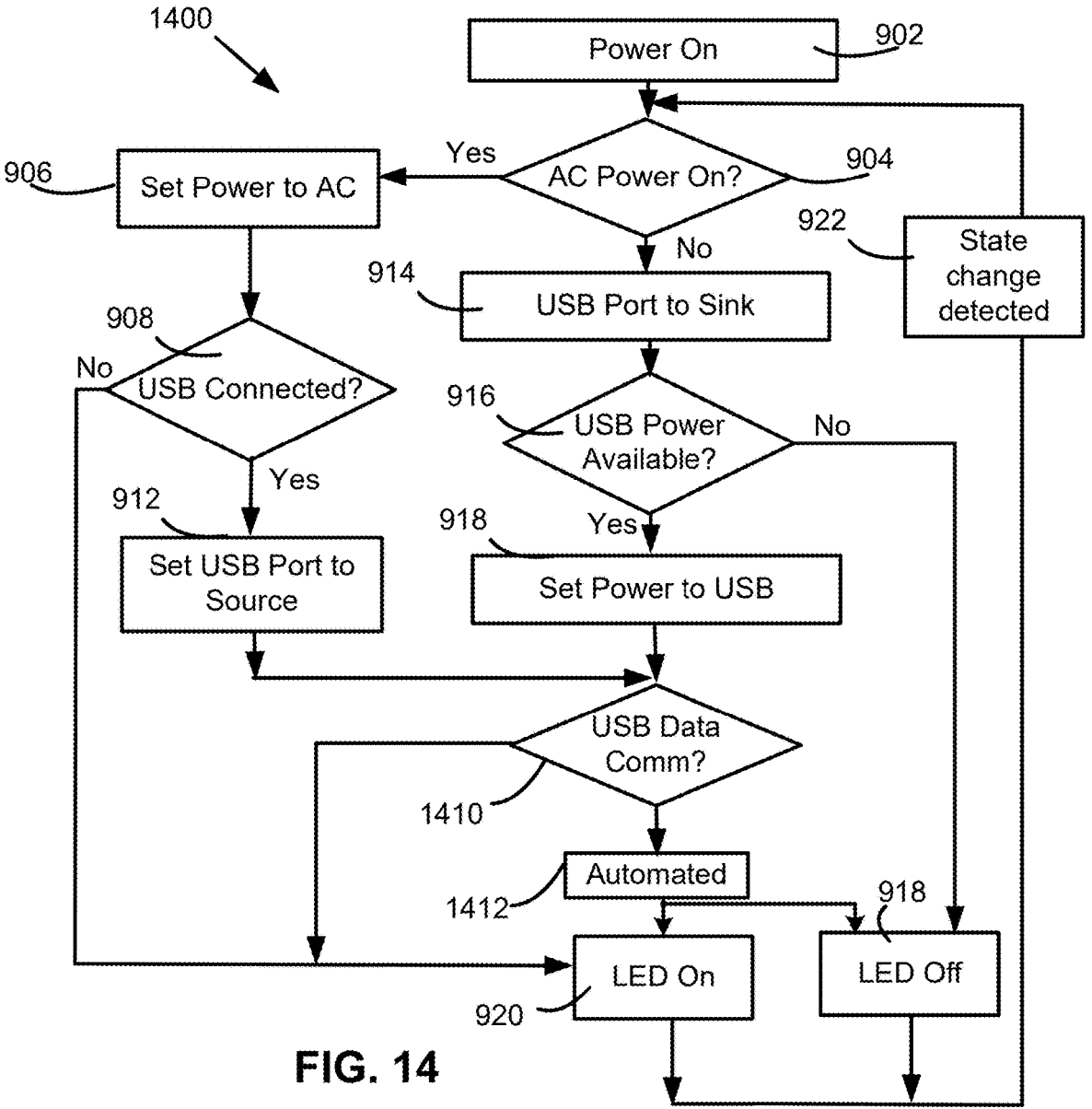
FIG. 14 illustrates a method for operating the lightbulb, without reliance on the internal battery, which includes the automated control instead of the manual switch.

FIG. 14 illustrates a method 1400 for operating the lightbulb 100 without reliance on the internal battery 736, in which the operation of the lightbulb is automatic, using the automated control 716 instead of the manual switch 718. In some embodiments, the circuit that implements method 1400 may only include the AC socket connector 702, the AC-to DC converter 704, the AC sensor 706, the power switching circuit 708, the controller 710, the USB-C interface 712, the automated control 716 and the LED array 720 (see FIG. 10). The method 1400 is similar to the method 1300. However, in the method 1400, after the step 1312 or 1318, the controller 710 determines whether the lightbulb 100 is ready to receive USB communications by the USB-C interface 712 (step 1410). For example, controller 710 checks the USB Power Delivery (PD) role-source or sink-negotiated for USB-C interface 712. If controller 710 detects USB data signaling or a configuration channel (CC) communication at a port, the controller configures the port for data communication or role negotiation as appropriate. If, as determined by the controller 710, the system is not ready for USB communications, the lightbulb 100 is placed in the on state by the power switching circuit 708 (step 1320). If the controller 710 determines that the system is ready for USB communications, the lightbulb 100 is placed under automated control by the automated control 716 (step 1412) and then proceeds to the on state (step 1320).

Figure 15:
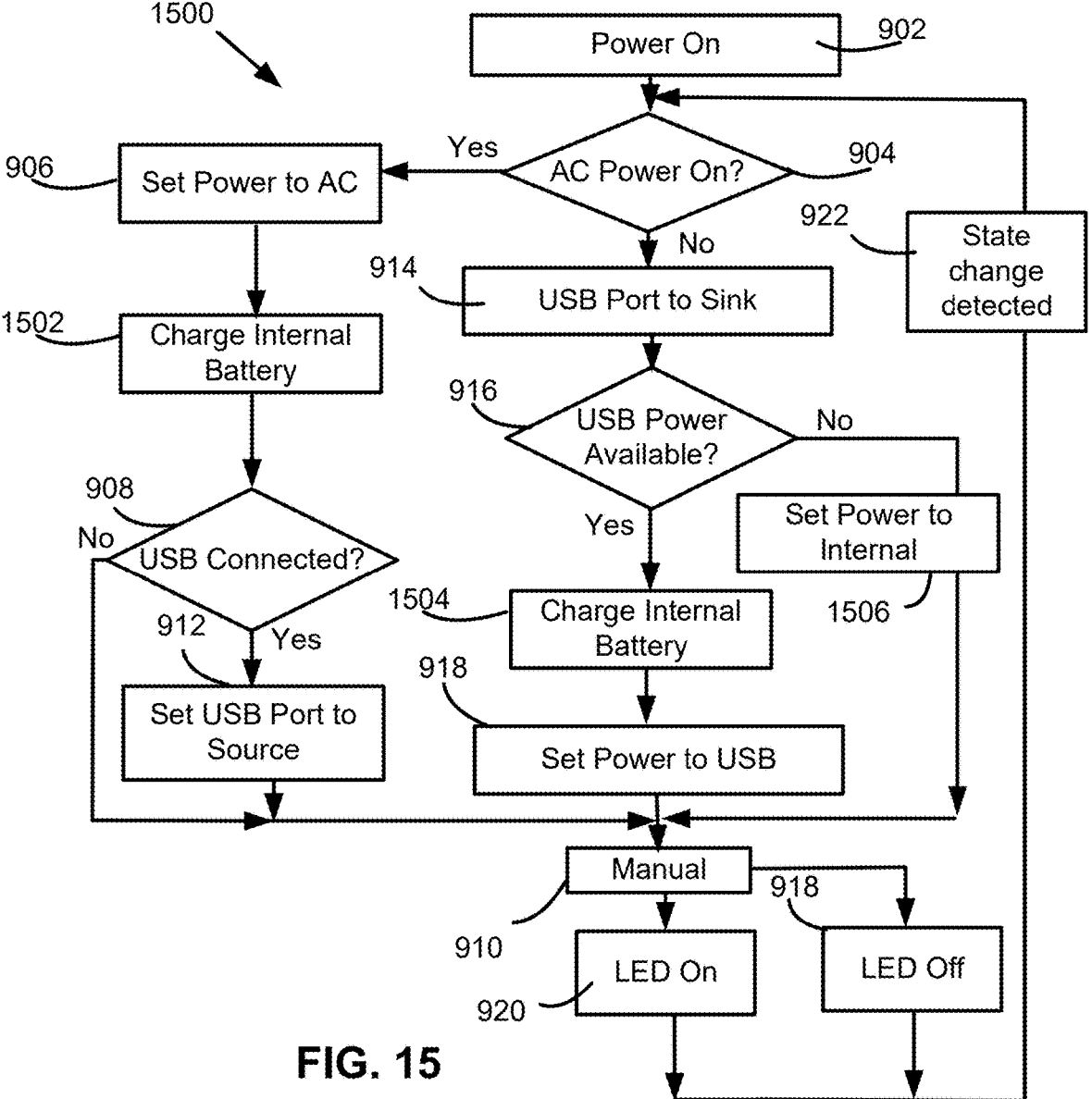
FIG. 15 illustrates a method for operating a lightbulb for a system having an internal battery and a battery charger, in which the operation of the lightbulb is automatic, using the automated control instead of manual switching.

FIG. 15 illustrates a method 1500 for operating the lightbulb 100 for a system having the internal battery 736 and the battery charger 734, in which the operation of the lightbulb 100 is automatic, using the automated control 716 instead of the manual switch 718. In some embodiments, the circuit that implements method 1500 only includes the AC socket connector 702, the AC-to-DC converter 704, the AC sensor 706, the power switching circuit 708, the controller 710, the USB-C interface 712, the manual switch 718, the LED array 720, the battery charger 734 and the internal battery 736 (see FIG. 11). The method 1500 is similar to method 1300. However, in method 1500 after step 1306, the battery is charged by the battery charger 734 (steps 1502). Whereas, after step 1316, if the controller 710 determines that USB power is available (at the USB-C interface 712), the internal battery 736 is charged by the battery charger 734 (step 1504). If the controller 710 determines that USB power is not available at the USB-C interface 712, the power is set by the power switching circuit 708 to the internal battery 736 (step 1506).

Figure 16:
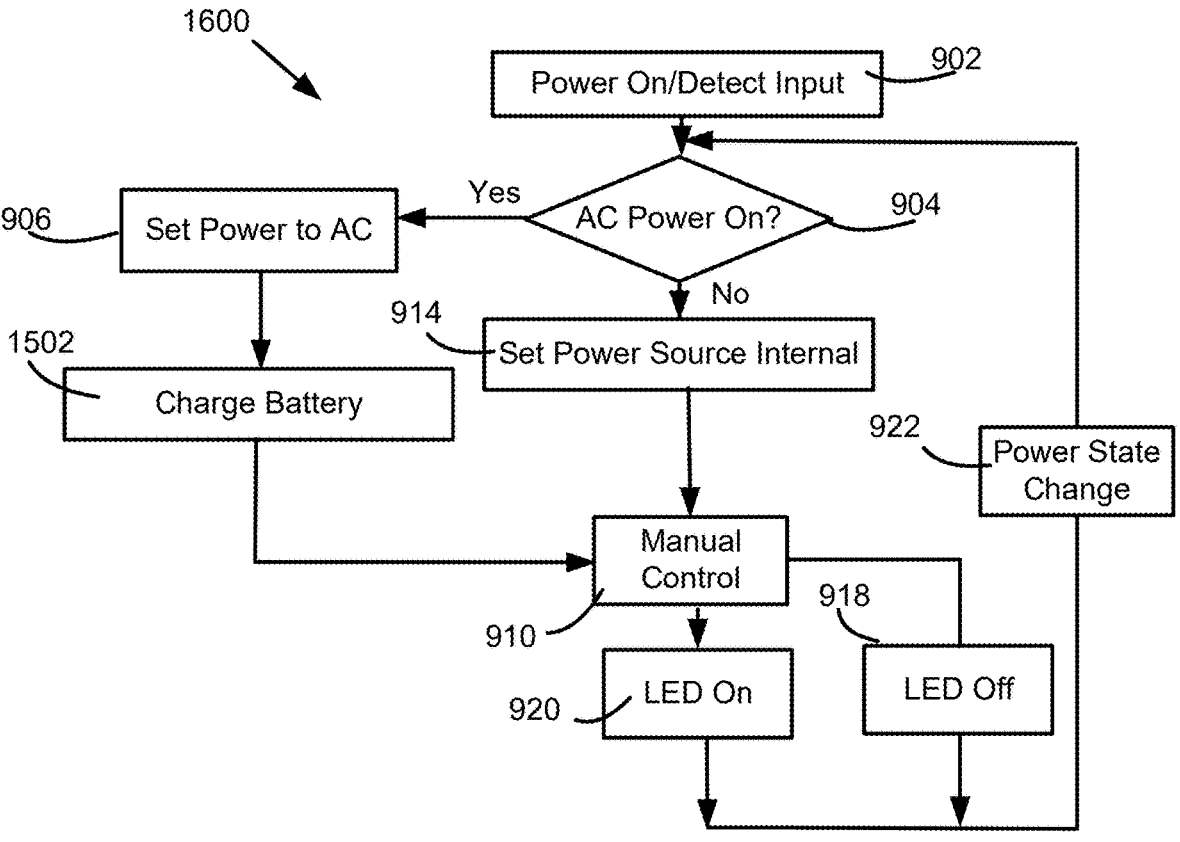
FIG. 16 illustrates a method for operating a lightbulb for a system having an internal battery and a battery charger, in which the operation of the lightbulb is automatic, using the automated control instead of manual switching.

FIG. 16 illustrates a method 1600 for operating the lightbulb 100 for a system having the internal battery 736 and the battery charger 734, in which the operation of the lightbulb 100 is automatic, using the automated control 716 instead of the manual switch 718. In some embodiments, the circuit that implements method 1500 only includes the AC socket connector 702, the AC-to DC converter 704, the AC sensor 706, the power switching circuit 708, the controller 710, the manual switch 718 and the LED array 720 the battery charger 734 and the internal battery 736 (see FIG. 12). The method 1600 is similar to the method 1500. However, in the method 1600 after step 1502 or step 914, the method proceeds directly to step 1310.

Table of Manufacturer Part Numbers

Below is a table of the manufacturer part numbers referenced, correlating each manufacturer part number with the manufacturer and a short description of the part number.

| Component | Manufacturer | Function in System |
|---|---|---|
| IRF7413 | Infineon (formerly International Rectifier) | N-channel MOSFET used in power path switching |
| SI4431 | Vishay Siliconix | P-channel MOSFET used in an ideal diode or switching configuration |
| BT136 | NXP Semiconductors; STMicroelectronics | TRIAC used for AC power switching |
| BQ27441 | Texas Instruments | Battery fuel gauge for SoC monitoring |
| PC814 | Sharp; Everlight | Opto-isolator for AC detection |
| HCPL-817 | Broadcom (formerly Avago) | Opto-isolator for AC detection |
| STM32G0 | STMicroelectronics | Microcontroller used for system control |
| PY32F002B | Puya Semiconductor | Alternative microcontroller for cost-optimized builds |
| TPS2121 | Texas Instruments | Automatic power MUX for input switching |
| MP2359 | MPS (Monolithic Power Systems) | Synchronous buck converter for LED current regulation |
| TPS62125 | Texas Instruments | Step-down converter for LED regulation |
| STUSB4500 | STMicroelectronics | USB Power Delivery sink controller |
| IP2726 | Injoinic Technology | USB PD protocol controller |
| MP2759 | MPS (Monolithic Power Systems) | USB-C buck/boost charger for PD output |
| TPS25750 | Texas Instruments | USB PD controller with integrated power path |
| FUSB302B | Onsemi (formerly Fairchild Semiconductor) | USB PD controller |
| FSUSB242 | Onsemi | USB MUX for signal routing |
| LTC4412 | Analog Devices (formerly Linear Technology) | Ideal diode controller |
| TPS22976 | Texas Instruments | Load switch with protection |
| BQ24133 | Texas Instruments | Solar-compatible battery charger |
| CN3791 | Consonance Electronics | MPPT solar charger controller |
| LT3652 | Analog Devices (formerly Linear Technology) | MPPT charger for solar input |
| BQ25570 | Texas Instruments | Ultra-low power MPPT charger |
| TPS22990 | Texas Instruments | Load switch used with hot-swapping |
| HC-SR505 | Various (Generic/OEM) | PIR motion sensor |
| EKMC1601111 | Panasonic | PIR motion sensor |

Although the disclosed method and apparatus are described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A lighting system comprising:
(a) an alternating current (AC) socket connector for connecting to an AC power source;
(b) an AC to direct current (DC) converter having an AC input connected to the AC socket connector and a DC output;
(c) a light source being electrically connected to an output of a power switching circuit, the power switching circuit having at least a first power input and a second power input;
(d) a USB-C port compliant with a USB Power Delivery (USB PD) protocol, serving as a battery interface electrically connected to the first power input of the power switching circuit;

(e) the DC output of the AC-to-DC converter being connected to the second power input of the power switching circuit;

(f) a housing that houses the lighting system;

(g) a manual switch mounted on the housing and electrically connected in series with the light source, the manual switch including an ON setting, an OFF setting and/or a brightness adjustment;

(h) an external battery pack that connects to a USB-C port, the external battery pack being detachable and physically separate from the housing;

(i) a controller that (1) monitors an availability of the AC power source using an AC sensor;

(2) detects when the external battery pack is present, via a USB PD communication;

(3) detects when the external battery pack is absent via the USB PD communication;

(4) causes the power switching circuit to draw power from the AC power source that is providing power; and (5) causes the power switching circuit to switch power sources from the AC power source to the external battery pack when the AC power source is not providing power.

2. The lighting system of claim 1 further comprising a visual indicator disposed on the housing, the visual indicator providing indications of one or more of power source status, battery charge level, on/off status, or system conditions.

3. The lighting system of claim 1, wherein the USB-C port supports a USB PD role negotiation to dynamically determine the external battery pack as a power source when the AC power source is providing power and as a power sink when the AC power source is not providing power.

4. The lighting system of claim 1, wherein the external battery pack:

(a) is compliant with the USB PD protocol supporting multiple negotiated voltages; and (b) is independently rechargeable via a standard USB-C connector.

5. The lighting system of claim 1, further comprising:

a hot-swapping circuit that reduces affects on the lighting system when switching from a first power source to a second power source.

6. The lighting system of claim 1, further comprising:

a capacitor electrically connected in parallel with the light source, the capacitor maintaining operation of the light source while switching power from a first power source to a second power source, therein enabling uninterrupted operation of the light source while hot-swapping between the first power source and the second power source.

7. The lighting system of claim 1, further comprising a solar panel that electrically connects to a DC input of the lighting system, the lighting system storing one or more machine instructions in a non-transient memory, wherein invoking the one or more machine instructions, by the lighting system, causes:

(a) the power switching circuit to charge an external USB PD-compliant battery from the solar panel and power the light source, based on system demand and available current from the solar panel; and (b) the controller to prioritize powering the lighting system by the solar panel rather than other available power sources when the solar panel provides more than a threshold power to the lighting system.

8. The lighting system of claim 1, wherein the external battery pack:

(a) is compliant with a USBC PD; and (b) supports varying runtime or performance requirements.

9. The lighting system of claim 1, the lighting system including machine instructions, invoking the machine instructions by the lighting system, causes the controller to transmit operational data to a mobile device connected to the USB-C port, the operational data including battery level, power source status, and light intensity.

10. The lighting system of claim 1, further comprising a surge protection circuit that protects the lighting system from a power source that does not comply with a power interface of the lighting system.

11. The lighting system of claim 1, further comprising an environmental sensor, electrically connected to the power switching circuit, wherein the light source is activated in response to the environmental sensor sensing a change in ambient conditions.

12. A lighting system comprising:

(a) an alternating current (AC) socket connector for connecting to an AC power source;

(b) an AC to direct current (DC) converter having (1) an AC input connected to the AC socket connector and (2) a DC output;

(c) a USB-C port that supports a USB Power Delivery (USB PD) protocol and bidirectional data communication;

(d) a power switching circuit;

(e) a light source electrically connected to an output of the power switching circuit, the power switching circuit having inputs from the AC-to-DC converter and the USB-C port;

(f) the lighting system storing one or more machine instructions in a non-transient memory, wherein invoking the one or more machine instructions by the lighting system causes:

(1) the USB-C port to be set to a power source role to supply power to an external USB PD-compliant device when AC power is received at the AC socket connector;

(2) the USB-C port to be set to a power sink role to receive power from the external USB PD-compliant device when the AC power is not received at the AC socket connector;

(3) operational data to be transmitted and received via the USB-C port to and from the external USB PD-compliant device, the operational data including light source status power source information, and control commands from the external USB PD-compliant device;

(g) the power switching circuit being electrically connected to the AC-to-DC converter and the USB-C port, invoking the one or more machine instructions, by a controller, further causing the controller to:

(1) dynamically manage USB PD role negotiations based on an availability of the AC power source; and (2) determine a direction and timing of data communications with the external USB PD-compliant device, in accordance with a state of the lighting system.

13. The lighting system of claim 12, further comprising a) a housing that houses the lighting system and b) a manual switch mounted on the housing, (1) the manual switch being electrically connected in series with the light source, and (2) the manual switch affecting power provided to the light source, when the lighting system is powered via the USB-C port.

14. The lighting system of claim 12, further comprising:

a housing that houses the lighting system, and a visual indicator disposed on the housing, the visual indicator providing indications of one or more of: power source status, battery charge level, on/off status, or system conditions, such as fault warnings or operational modes.

15. The lighting system of claim 12, the lighting system storing one or more machine instructions in the non-transient memory, invoking the one or more machine instructions by the lighting system, a) causes receiving from the external USB PD-complaint device to be prioritized over receiving power from other power sources, when AC power is not received at the AC socket connector, and b) causes the light source to revert to being powered by the AC power source to supply power to the external USB PD-compliant device, when AC power is restored to the AC socket connector.

16. The lighting system of claim 12, the lighting system storing one or more machine instructions in the non-transient memory, invoking the one or more machine instructions by the controller, causes the controller to at least perform one of: receive the control commands and transmit system diagnostics via USB PD data communication to the external USB PD-complaint device.

17. The lighting system of claim 12, the operational data including diagnostics, which includes:

a real-time brightness level, a power source status, and an estimated power consumption.

18. The lighting system of claim 12, further comprising a mobile device, having an application installed on the mobile device stored in non-transient memory of the mobile device, the application, invoking the application by the mobile device, causes the mobile device to monitor operations of the lighting system, and transmit operational instructions to the lighting system via the USB PD protocol.

19. The lighting system of claim 12, further comprising an interface that connects electrically to a solar panel, wherein:

(a) the lighting system includes logic, which, when invoked by the lighting system, causes the controller to route power from the solar panel to a USB port, when the USB port is set to a role of being a power source for external devices; and (b) the power switching circuit monitors power being supplied by the solar panel and prioritizes charging a mobile device when AC power is not being received at the AC socket connector.

20. A lighting system comprising:

(a) an alternating current (AC) socket connector for connecting to an AC power source;

(b) an AC to direct current (DC) converter having an AC input connected to the AC socket connector and a DC output;

(c) an internal battery, (d) a battery charger electrically connected to the DC output of the AC-to-DC converter and to the internal battery for charging the internal battery;

(e) a USB-C port supporting a USB Power Delivery (USB PD) protocol for connecting to external battery modules;

(f) a light source electrically connected to the DC output of a power switching circuit, the power switching circuit having power inputs from the AC-to-DC converter, the internal battery, and the USB-C port;

(g) a housing that houses the lighting system;

(h) a manual switch mounted on the housing, (1) the manual switch switching between electrically connecting the light source to the power switching circuit and not connecting the light source to the power switching circuit, (2) the manual switch controlling operation of the light source when the light source is powered by the internal battery and when the light source receives power via the USB-C port;

(i) a controller, which controls the lighting system and sets a role for the USB-C port;

(j) the lighting system including logic, wherein invoking the logic by the lighting system, causes the controller to determine:

(1) when power is received at the AC socket, set the role of the USB-C port to be a power source for supplying power to an external USB PD-compliant device;

(2) when power is not received at the AC socket, set the role of the USB-C port to be a power sink for receiving power via the USB-C port; and (3) direct power received at the USB-C port to (A) charge the internal battery and (B) power the light source, based on current and system conditions;

(k) the power switching circuit being electrically connected to the AC-to-DC converter, the USB-C port, the internal battery, and the controller causing the power switching circuit to:

(1) route power in a direction that is based on whether AC power is received at the AC socket connector and the role negotiated for the USB-C port; and (2) therein ensure a continuous operation of the light source based on a prioritization of power sources.

21. The lighting system of claim 20, the lighting system including logic, which, when invoked by the lighting system, causes the controller to a) dynamically negotiate USB PD roles based on whether AC power is received at the AC socket connector, and b) prioritize operating the USB-C port (1) as a source of power for external devices, when the role of the USB-C port is set as source, and (2) as a sink, via which the lighting system is powerable, when the role of the USB-C port is set as sink.

22. The lighting system of claim 20, the lighting system including logic, which, when invoked by the lighting system, causes the controller to direct power received from the external USB PD-complaint device to simultaneously power the light source and charge the internal battery, based on available power capacity and system demand.

23. The lighting system of claim 20, the lighting system including logic, which causes the internal battery to be charged automatically upon restoration of AC power, regardless of what status the manual switch has.

24. The lighting system of claim 20, comprising an external battery chamber that (a) is compliant with the USB PD protocol, supporting a variety of negotiated voltages; and (b) is independently rechargeable via the USB-C port.

25. The lighting system of claim 20, further comprising a visual indicator disposed on the housing, the visual indicator including visual indications of at least one of:

(a) a current USB PD role;

(b) internal battery charge level;

(c) charging status;

(d) power source currently in use; or e) on/off status.

26. The lighting system of claim 20, further comprising: an environmental sensor, electrically connected to the power switching circuit, wherein the light source is activated in response to the environmental sensor sensing a change in ambient conditions.

27. The lighting system of claim 20, wherein an external battery container:

(a) is interoperable with a plurality of lighting systems conforming to a common interface standard; and (b) is provided in multiple capacities to support varying runtime or performance requirements.

28. The lighting system of claim 20, further comprising a solar panel electrically connected to an interface of the lighting system, wherein:

(a) the lighting system including logic, which when invoked by the controller, causes the controller to direct power from the solar panel to simultaneously or selectively charge the internal battery, charge an external USB PD-compliant battery, and power the light source, based on system demand and available current; and (b) the power switching circuit prioritizing solar power over other available sources when sufficient solar input is available to power the light source.

29. A lighting system comprising:

(a) an Alternating Current (AC) socket connector that connects to an AC power source that provides AC power;

(b) an AC to direct current (DC) converter having an AC input connected to the AC socket and a DC output;

(c) a housing that houses the lighting system;

(d) an internal DC power source comprising a non-removable rechargeable battery fixed within the housing, and an integrated battery charger, the battery charger being electrically connected to the DC output of the AC-to-DC converter and to the internal DC power source for charging;

(e) a light source electrically connected to the output of a power switching circuit, the power switching circuit having inputs from the AC-to-DC converter and the internal DC power source;

(f) a sensor configured to detect a presence and absence of the AC power;

(g) a manual switch mounted on the housing that is electrically connected in series with the light source, the manual switch controlling a state of the light source, including (1) whether the light source is ON, (2) whether the light source is OFF and (3) a brightness of the light source, while the light source is powered by the AC power source and while the light source is powered by the internal DC power source;

(h) a controller;

(i) the lighting system including logic, wherein invoking the logic by the controller causes the controller to (1) receive status signals from the sensor indicating the presence of the AC power and the sensor indicating the absence of the AC power; and (2) direct the power switching circuit to select an appropriate power source for the light source based on power availability;

(j) the power switching circuit being electrically connected to the AC-to-DC converter, the internal DC power source, and the controller, and the power switching circuit providing power to the light source through the manual switch, the controller controlling the power switching circuit to therein cause:

(1) a prioritizing of delivery of power to the light source from the AC power source when available; and (2) upon detecting the absence of the AC power, switching control to the internal DC power source while maintaining manual operation of the light source via the manual switch; and k) a visual indicator disposed on the housing, the visual indicator providing indications of one or more of: power source status, battery charge level, on/off status, or system conditions.

* * * * *